(12) United States Patent
Robinson et al.

(10) Patent No.: US 10,163,140 B2
(45) Date of Patent: Dec. 25, 2018

(54) ONLINE MERCHANTS TO THIRD PARTY WAREHOUSE PROVIDERS BROKER AND ORDER FULFILLMENT SYSTEM

(75) Inventors: Evan Robinson, San Jose, CA (US); Damon Schechter, Los Angeles, CA (US)

(73) Assignee: Shipwire, Inc., Irvine, CA (US)

( * ) Notice: Subject to any disclaimer, the term of this patent is extended or adjusted under 35 U.S.C. 154(b) by 544 days.

(21) Appl. No.: 12/422,163

(22) Filed: Apr. 10, 2009

(65) Prior Publication Data
US 2010/0262521 A1    Oct. 14, 2010

(51) Int. Cl.
| G06Q 30/00 | (2012.01) |
| G06Q 30/06 | (2012.01) |
| G06Q 10/08 | (2012.01) |
| G06Q 30/02 | (2012.01) |

(52) U.S. Cl.
CPC ............. *G06Q 30/06* (2013.01); *G06Q 10/08* (2013.01); *G06Q 10/087* (2013.01); *G06Q 10/0875* (2013.01); *G06Q 30/0283* (2013.01)

(58) Field of Classification Search
CPC .... G06Q 10/08; G06Q 10/087; G06Q 10/083; G06Q 30/0613; G06Q 30/0605
USPC ..................................................... 705/28, 29
See application file for complete search history.

(56) References Cited

U.S. PATENT DOCUMENTS

| 7,574,383 | B1 * | 8/2009 | Parasnis | ........... G06Q 10/06315 |
| | | | | 705/22 |
| 2002/0178028 | A1 | 11/2002 | King | |
| 2003/0171962 | A1 * | 9/2003 | Hirth | ................ G06Q 10/06315 |
| | | | | 705/7.25 |
| 2003/0204447 | A1 | 10/2003 | Dalzell et al. | |
| 2005/0055368 | A1 * | 3/2005 | Bruening | .......... G06F 17/30592 |
| 2006/0116936 | A1 | 6/2006 | Lucas | |
| 2007/0174144 | A1 | 7/2007 | Borders et al. | |
| 2007/0174151 | A1 | 7/2007 | Anderson et al. | |

(Continued)

OTHER PUBLICATIONS

PCT Search Report and Written Opinion for PCT/US10/30627, dated Jun. 8, 2010, 8 pages.

*Primary Examiner* — Talia F Crawley
(74) *Attorney, Agent, or Firm* — Nicholson De Vos Webster & Elliott LLP

(57) ABSTRACT

An online merchants to third party warehouse providers broker and order fulfillment system is coupled with different third party warehouse providers that each operate one or more third party warehouses and a plurality of online merchants that use the services provided by the third party warehouse providers. The online merchants to third party warehouse providers broker and order fulfillment system includes an order fulfillment server to provide a common merchant interface to the services provided by the third party warehouse providers, a common warehouse interface to allow each of the different third party warehouse provider to communicate with the order fulfillment server in a common way including the status of the services they provide and allows each of the different third party warehouse providers to review all services requested by them, and a system operator interface to allow system operators to manage the third party warehouses including creating disaster recovery plans in case of a warehouse failure and generating a reverse invoice for each third party warehouse.

31 Claims, 21 Drawing Sheets

(56) References Cited

U.S. PATENT DOCUMENTS

2008/0065506 A1  3/2008 Shillington
2008/0262865 A1  10/2008 Cotton et al.

* cited by examiner

ONLINE MERCHANTS TO THIRD PARTY WAREHOUSE PROVIDERS BROKER AND ORDER FULFILLMENT SYSTEM

BACKGROUND

Field

Embodiments of the invention relate to warehouse management, and more specifically to performance monitoring and risk management of warehouses of which the merchants do not possess ownership or direct control.

Background

Many merchants contract with third-party logistics providers ("3PLs") in order to minimize the considerable financial investment that would otherwise be required to meet their warehousing needs. Retaining a 3PL of warehousing services ("3PL warehouse") can offer substantial time and financial cost benefits when compared with the alternative of employing warehouse staff and acquiring, operating, and maintaining warehouse facilities. Historically, however, working with a third-party warehouse has come with its own set of risks and hidden costs for the retaining merchants. In particular, the merchants become reliant on the 3PL warehouse's timely and accurate execution of the requests of the merchants, and has limited recourse if the 3PL warehouse fails to perform (e.g., the merchants can bear the financial cost of the errors, the merchants can seek reimbursement (which requires the merchants to spend time demonstrating and quantifying the nonperformance), or the merchants can choose another warehouse, which demands costly relocation and rerouting of inventory, and either selection of a new 3PL warehouse or investment in one's own warehouse).

Existing solutions trade off the fixed recurring costs of owning and operating a warehouse for unknown and variable recurring costs of retaining a potentially unreliable third-party warehouse provider. In addition, often these 3PL warehouses have different procedures (e.g., different forms, different phone numbers, different formats of reports, etc.) and therefore different interfacing requirements for the merchants to keep track of in order to deal with the 3PL warehouses. Typically, the smaller the merchant, often the more difficult the problem.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
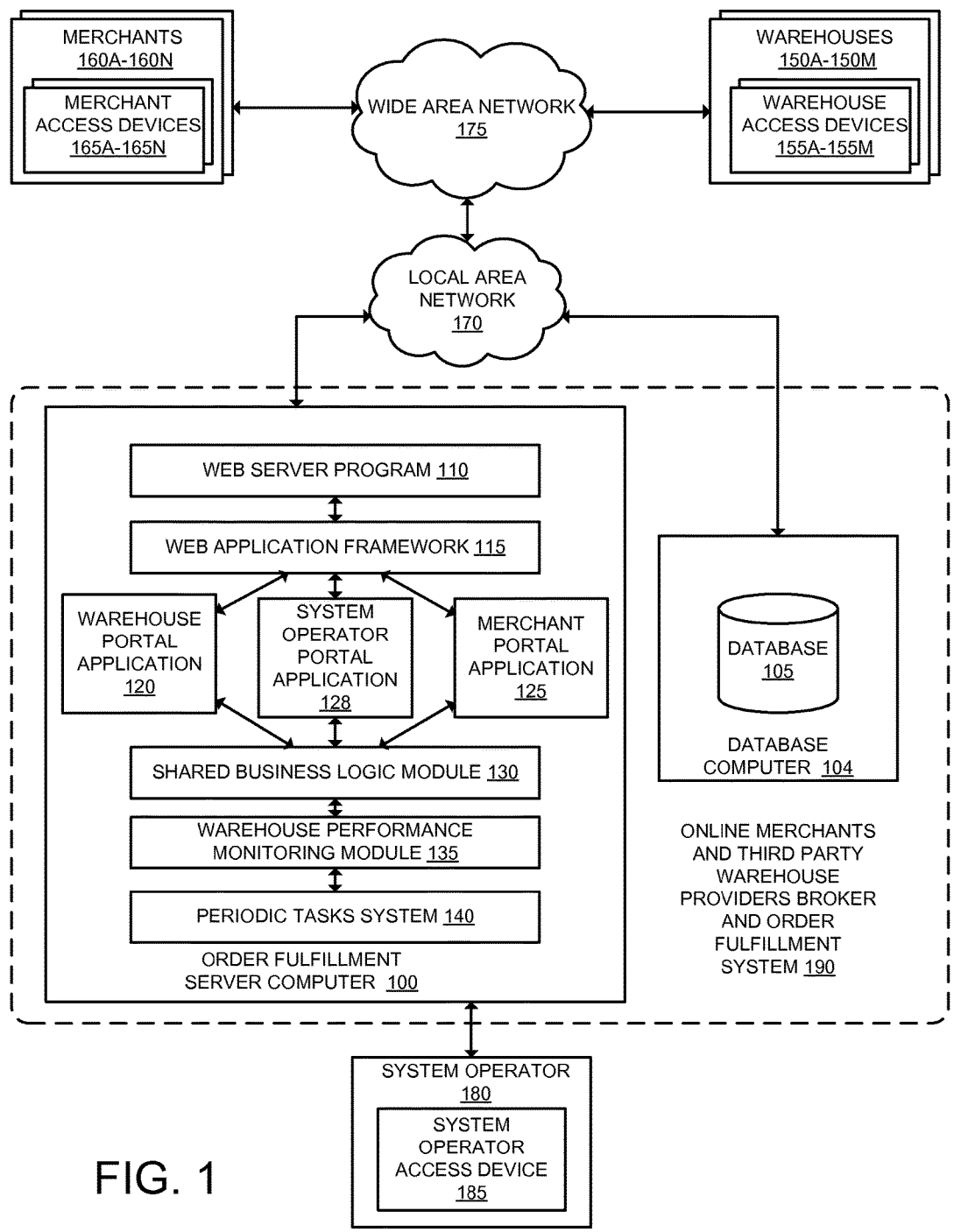
FIG. 1 illustrates an online merchants to third party warehouse providers broker and order fulfillment system coupled with multiple merchants and multiple, different, warehouses according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more computing devices (e.g., an order fulfillment server, access devices, etc.). Such computing devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

A method and apparatus for an online merchants to third party warehouse providers broker and order fulfillment system is described. Each of a plurality of different third party warehouses providers operate a set of one or more physical warehouses with a set of one or more warehouse access devices, while each of the online merchants operate their online stores with a set of one or more merchant access devices. In one embodiment of the invention, an order fulfillment server is coupled between the access devices of the third party warehouse providers and the online merchants. The plurality of physical warehouses are not owned, operated, or directly controlled by the order fulfillment server or the plurality of online merchants, but are used to provide warehouse services (e.g., storage space, packing, shipping, etc.) for the plurality of online merchants. The order fulfillment server provides a common interface and tools for each of the plurality of third party warehouse providers, provides tools for each of the plurality of online merchants to send shipping orders, inbound shipment details, and special project requests to the third party warehouse providers that are storing their products, and provides tools for the system operator to manage the third party warehouse providers.

FIG. 1 illustrates an online merchants to third party warehouse providers broker and order fulfillment system (hereinafter "merchants and warehouses broker and order fulfillment system") 190 including an order fulfillment server 100 coupled with the merchant access devices 165A-165N of the merchants 160A-160N, the system operator access device 185, and the warehouse access devices 155A-155M of the different warehouses 150A-150M. The merchants and warehouses broker and order fulfillment system 190 includes an order fulfillment server computer 100 that provides an environment for executing software programs and a database computer 104 that provides a database 105 for storage of data. The order fulfillment server computer 100 and database computer 104 are operatively connected to a local area network 170 that supports communication between the database computer 104 and the order fulfillment server computer 100. In one embodiment of the invention, the database computer 104 is configured in such a manner as to restrict communication to the order fulfillment server computer 100 alone. Although the order fulfillment server computer 100 and the database computer 104 are illustrated as being separate, in one embodiment of the invention the order fulfillment server computer 100 and the database computer 104 are implemented on the same device.

The local area network 170 is also operatively coupled with a wide area network 175 (e.g., the Internet). The local area network 170 and wide area network 175 cooperate to provide the order fulfillment server computer 100 with communication with a plurality of merchant access devices 165A-165N and a plurality of warehouse access devices 155A-155M connected to the wide area network 175.

The plurality of merchant access devices 165A-165N are operated by the plurality of online merchants 160A-160N respectively. As used herein, a online merchant sells products through an online marketplace and stores those products in one or more 3PL warehouses until they are purchased. For example, the merchants 160A-160N are each online merchants that store their goods in one or more 3PL warehouses until they are ready to be shipped to buyers. Thus, the merchants 160A-160N do not own, operate, or control their own warehouse(s). As used herein, the term "inbound shipment" refers to the shipment of goods from the merchants 160A-160N to the warehouses 150A-150M (directly or indirectly), as opposed to the term "shipping order" (or "outbound shipping order"), which refers to the shipment of goods from the warehouses 150A-150M to the buyer(s) of those goods (typically through different common carriers servicing those warehouses 150A-150M).

According to one embodiment of the invention, the merchant access devices 165A-165N are computing devices operatively coupled to the wide area network 175, and each connect and use the merchants and warehouses broker and order fulfillment system 190 (e.g., through a web browser program, text messages, email messages, etc.), which will be described in greater detail later herein.

The plurality of warehouse access devices 155A-155M are operated by clients of the plurality of warehouses 150A-150M respectively. A warehouse client is a third party warehouse provider one or more of the warehouses 150A-150M that provides services (e.g., storage, shipping, and other related services) for one or more of the merchants 160A-160N. For example, the warehouse clients each operate or control one or more of the warehouses 150A-150M. The warehouses 150A-150M are 3PL warehouses and are not owned, operated, or directly controlled by the owner/operator of the order fulfillment server 100 (of the merchants and warehouses broker and order fulfillment system 190) or any of the merchants 160A-160N. In addition, at least some of the warehouses 150A-150M are located in different geographic locations (e.g., including within, and outside of, the United States). In addition, each of the warehouses 150A-150M may have different capabilities (e.g., storage capabilities, technical capabilities, etc.), and thus, at least some are different. For example, some of the warehouses 150A-150M may have the ability to store frozen goods while others may not. The warehouse access devices 155A-155M are computing devices operatively coupled to the wide area network 175, and each connect and use the merchants and warehouses broker and order fulfillment system 190 (e.g., through a web browser program, text messages, email messages, or other forms of communication), which will be described in greater detail later herein. For example, the warehouse access devices 155A-155M may include desktop computers, workstations, laptops, palmtops, smartphones, warehouse inventory scanners, etc.

The system operator access device 185 is operated by the system operator 180. The system operator 180 is an administrator of the merchants and warehouses broker and order fulfillment system 190 and may act as mediator between the merchants 160A-160N and the warehouses 150A-150M. The system operator 180 also supervises the performance of the warehouses 150A-150M and may intervene when exceptions arise in normal system operation.

As will be described later herein, in one embodiment of the invention, the merchants 160A-160N do not directly retain the services of the warehouses 150A-150M (that is, the merchants 160A-160N do not enter into any contracts with the warehouses 150A-150M). In one embodiment of the invention, the order fulfillment server 100 brokers warehouse space in the warehouses 150A-150M on behalf of the merchants 160A-160N on space previously leased. For example, the merchants and warehouses broker and order fulfillment system 190 has leased space in the warehouses 150A-150M and that space may be used to store the goods of the merchants 160A-160N. In one embodiment of the invention, the merchants 160A-160N ship their goods to a location specified with the merchants and warehouses broker and order fulfillment system 190 (which may or may not reveal/specify the actual warehouse that will store the their goods), and those goods are shipped selectively to the specified ones of the warehouses 150A-150M. The entity that ships the goods to the warehouses 150A-150M may be different in different embodiments of the invention (e.g., the goods may be shipped directly by the merchants 160A-160N to the warehouses 150A-150M, or the merchants and warehouses broker and order fulfillment system 190 may cause the goods to be shipped to the warehouses 150A-150M). In one embodiment of the invention, the merchants 160A-160N are not aware of which of the warehouses their goods are ultimately stored at.

The order fulfillment server computer 100 includes different modules that allow the merchant access devices 165A-165N, the warehouse access devices 155A-155M, and the system operator access device 185 to use the services of the merchants and warehouses broker and order fulfillment system 190. The order fulfillment server computer 100 includes the web server program 110, the web application framework 115, the warehouse portal application 120, the merchant portal application 125, the system operator portal application 128, the shared business logic module 130, the warehouse performance monitoring module 135, and the periodic tasks system 140.

The web server program 110 is configured to run on the order fulfillment server computer 100 and allows the order fulfillment server computer 100 to accept connections and requests communicated by the merchant access devices 165A-165N and the warehouse access devices 155A-155M connected to the wide area network 175. In one embodiment of the invention, the order fulfillment server computer 100 restricts with whom the order fulfillment server computer 100 may communicate to a predetermined list of authorized devices. The web server program 110 provides an environment for executing a plurality of additional software programs which can process accepted device requests as input to the additional software programs, returning the additional software programs' output as a response to the requesting device. The web server program 110 is configured to execute the web application framework 115 and to send all accepted requests as input to the web application framework 115.

The web application framework 115 is an additional software program which is installed on the order fulfillment server computer 100 in such a manner that it can be executed by the web server program 110. The web application framework 115 processes requests passed from the web server program 110 and determines which additional software program must be executed next in order to respond to a request. The web application framework 115 reads passed input from the web server program 110 and executes the warehouse portal application 120, executes the merchant portal application 125, or terminates. If the web application does not terminate, it passes the request it is processing to the next program executed (to either the warehouse portal application 120 or the merchant portal application 115).

The warehouse portal application 120 is an additional software program which is installed on the order fulfillment server computer 100 in such a manner that it can be executed by the web server program 110. The warehouse portal application 120 is used by the warehouses 150A-150M and allows each of the warehouses 150A-150M to communicate with the order fulfillment server computer 100 in a common way which will be described in greater detail later herein.

The merchant portal application 125 is an additional software program which is installed on the order fulfillment server computer 100 in such a manner that it can be executed by the web server program 110. The merchant portal application 125 is used by the merchants 160A-160N to communicate requests to and receive request status from the warehouses 150A-150M which will be described in greater detail later herein.

The system operator portal application 128 is an additional software program which is installed on the order fulfillment server computer 100 in such a manner that it can be executed by the web server program 110. The system operator portal application 128 is used by the system operator 180 to manage the warehouses 150A-150M which will be described in greater detail later herein.

The merchant access devices 165A-165N are configured to accept as input the wide area network 175 address of the order fulfillment server computer 100 and to make connections to the order fulfillment server computer 100 at said address for the purpose of sending requests on behalf of the merchants 160A-160N. The address of the order fulfillment server computer 100 is made known to the merchants 160A-160N who provide the address as input to the merchant access devices 165A-165N. The merchants 160A-160N control the merchant access devices 165A-165N for purposes of sending requests to, and receiving responses from, the merchant portal application 125.

Analogously, the warehouse access devices 155A-155M are configured to send requests to, and receive responses from, the warehouse portal application 120 on behalf of the warehouses 150A-150M.

Analogously, the system operator access device 185 is configured to send requests to, and receive responses from, the system operator portal application 128 on behalf of the system operator 180.

The periodic tasks system 140 is installed on the order fulfillment server computer 100 and executes a plurality of periodic tasks. For example, the periodic tasks system 140 executes processes of the warehouse performance monitoring module 135 for the purpose of monitoring performance of the warehouses 150A-150M.

The warehouse performance monitoring module 135 includes processes for the purpose of monitoring performance of the warehouses 150A-150M. For example, the warehouse performance monitoring module 135 periodically collects performance metrics from the warehouses 150A-150M, which will be described in greater detail later herein. The performance metrics may be stored in the database 105, and may be accessible by the system operator portal application 128 and the warehouse portal application 120.

The shared business logic module 130 is additional software which is installed on the order fulfillment server computer 100 and provides library functions to the warehouse portal application 120, the merchant portal application 125, the system operator portal application 128, the warehouse performance monitoring module 135, and the periodic tasks system 140.

The database 105 provides a system for storage and retrieval of data related to objects considered by the warehouses 150A-150M in the course of performing services for the merchants 160A-160N, and data related to the merchants 160A-160N that is used by those merchants 160A-160N when they use the merchants and warehouses broker and order fulfillment system 190.

Figure 2:
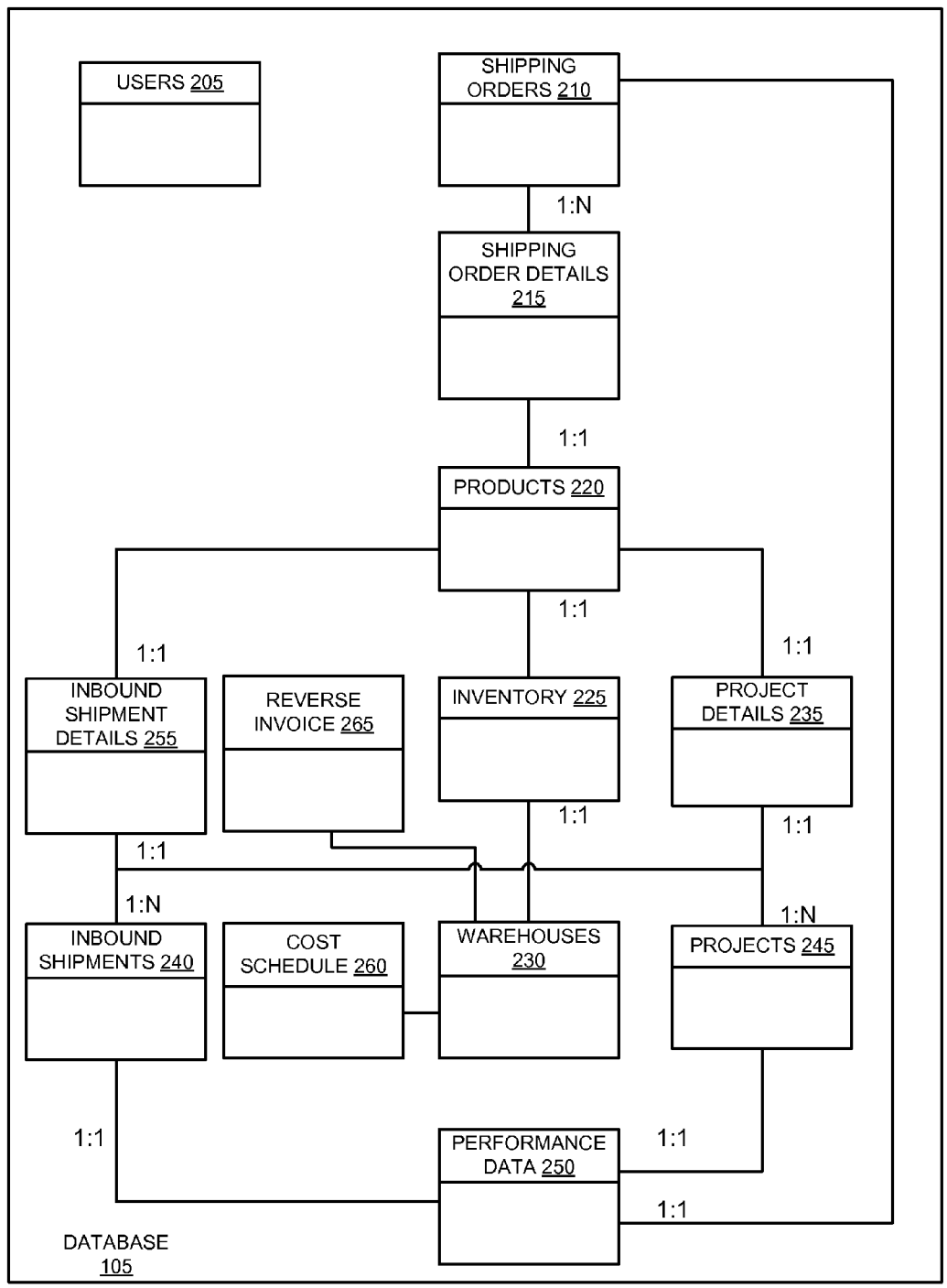
FIG. 2 illustrates an exemplary embodiment of a database used in the online merchants to third party warehouse providers broker and order fulfillment system of FIG. 1 according to one embodiment of the invention.

FIG. 2 is an exemplary embodiment of the database 105 according to one embodiment of the invention. As illustrated in FIG. 2, the database 105 is organized into tables and rows. While a single database has been illustrated, it should be understood that multiple databases may be used in embodiments of the invention (e.g., one or more databases for merchant related data and one or more databases for warehouse related data, each warehouse and/or each merchant may have their own database, etc.).

A product table 220 is provided for storing data regarding specific products that the merchants 160A-160N sell and need to be stored by one or more of the warehouses 150A-150M. As previously described, each of the warehouses 150A-150M may have different storage capabilities and each may not be able to store all products. According to one embodiment of the invention, the product table 220 includes a plurality of data rows, each row including an auto-incrementing integer primary key, stock keeping unit (SKU), product description, product length in inches, product width in inches, product height in inches, product weight in pounds, product wholesale cost in dollars, product and retail cost in dollars.

A warehouse table 230 is provided for storing data regarding properties and capabilities of the warehouses 150A-150M. The warehouse table 230 includes a plurality of data rows, each row including an auto-incrementing integer primary key, warehouse name, street address, city, region, country, geographic latitude, geographic longitude, phone number, contact e-mail address, shipping order execution price per item, inbound shipment execution price per item, and storage price per unit volume.

An inventory table 225 is provided for storing data regarding available product stock for a given product for a given merchant spread across one or more of the warehouses 150A-150M. The inventory table 225 includes a plurality of rows, each row including a composite natural key referring to the related SKU and the related warehouse 150A-150M, pending inbound count, good count, backordered count, allocated count, shipping count, shipped count, returned count, consuming count (the count of this product that is being used in a pending project), and creating count (the count of this product that will be created by a pending project). According to one embodiment of the invention, the inventory table 225 is updated in real time responsive to a shipping order being received by the merchants and warehouses broker and order fulfillment system 190.

An inbound shipment table 240 is provided for storing data regarding inbound shipments that have been arranged to arrive at the warehouses 150A-150M. The inbound shipment table 240 includes a plurality of rows, each row including an auto-incrementing integer primary key, a unique transaction identifier, the date of the inbound shipment's entry into the database 105, the inbound shipment's destination warehouse identifier, the inbound shipment's expected arrival date, the inbound shipment's carrier, the inbound shipment's tracking number, the last time the inbound shipment was able to be tracked, the date when the inbound shipment information was last transmitted to the warehouse, the time at which the inbound shipment was reported complete (e.g., received at the appropriate warehouse and reported as complete), and an auto-incrementing integer revision number representing the number of times that information about the inbound shipment has been edited.

An inbound shipment details table 255 is provided for storing data regarding the specific products and quantities of products that are expected in an inbound shipment. The inbound shipment details table 255 includes a plurality of rows, each row including an auto-incrementing integer primary key, the related product's identifier, the expected quantity, a count of outstanding pending quantity, and a count of received-to-date quantity.

A shipping order table 210 is provided for storing data regarding shipping orders which the merchants 160A-160N wishes for the warehouses 150A-150M to process. The shipping order table 210 includes a plurality of rows, each row including an auto-incrementing integer primary key, a unique transaction identifier, the date of the shipment's entry into the database 105, the shipment's consignee name, street address, city, state, region, postal code, country; the shipment's desired carrier, the shipment's tracking number, the time when the shipment information was transmitted to the warehouse, the time at which the order was reported shipped by the warehouse, the last time the order was able to be tracked, the shipment status at the last time the order was able to be tracked, the time the order was reported delivered, the time the order was reported returned, and the salability status of the order at the time of return.

A shipping order details table 215 is provided for storing data regarding the specific products and quantities of products that the merchants 160A-160N wishes to ship. The shipping order details table 215 includes a plurality of rows, each row including an auto-incrementing integer primary key, the related product's identifier, the expected quantity, a count of backordered quantity, a count of allocated quantity, a count of shipping quantity, a count of shipped-to-date quantity, and a count of returned-to-date quantity.

A project table 245 is provided for storing data regarding special projects which the merchants 160A-160N wishes for the warehouses 150A-150M to perform on products. A special project involves working on the inventory that is not strictly included in shipping or receiving. The following are examples of special projects: applying price tags to items in preparation for distribution to retailers; combining multiple single SKUs (stock keeping units) to form a new combined SKU (i.e., kitting); opening a container SKU and inventorying its contents (i.e., breaking down a lot); preparing a large shipment for freight pickup; adding labels to the products; photographing the inventory; measuring the inventory; and disposing of inventory. The project table 245 includes a plurality of rows, each row including an auto-incrementing integer primary key, the kind of work requested, the labor cost estimate provided by the warehouse 140, the completion date estimate provided by the warehouse 140, the actual labor cost provided by the warehouse 140 upon project completion, the actual project completion date, and the project's current status.

A project details table 235 is provided for storing data regarding the specific products and quantities of products that are involved in a special project. The project details table 235 includes a plurality of rows, each row including an auto-incrementing integer primary key, the related product identifier, the expected quantity of product to be consumed, the count of outstanding unconsumed product, the expected quantity of product to be created, and the count of outstanding uncreated product.

A user table 205 is provided for storing data regarding permitted users of the merchant portal application 125 (e.g., the permitted merchants 160A-160N), the warehouse portal application 120 (e.g., the permitted warehouses 150A-150M), and the system operator portal application 128 (e.g. the system operator 180). The user table 505 comprises a plurality of rows, each row comprising an auto-incrementing integer primary key, the username, an encrypted representation of a password credential, a user type indicator of whether the user represents a merchant, warehouse, or system operator, and which one or more of the warehouses 150A-150M with which the user is associated.

A cost schedule table 260 is provided for storing data regarding cost schedules for the warehouses 150A-150M. The cost schedule table 260 includes multiple rows, each row including an auto-incrementing integer primary key, a warehouse identifier, and one or more cost parameters (e.g., costs for correctly performed services (e.g., outbound shipping orders (based on the amount/size of the order), inbound shipment order (based on the amount/size of the order), amount of storage space consumed, cost for each special projects, etc.) as well as estimated costs to remedy erroneously performed or non-performed services). Each of the warehouses 150A-150M may have different cost parameters. In one embodiment, the cost schedule table 260 is used when generating reverse invoices which will be described later herein.

A reverse invoice table 265 is provided for storing data regarding reverse invoices generated for each of the warehouses 150A-150M. The reverse invoice table 265 includes multiple rows, each row including an auto-incrementing integer primary key, a warehouse identifier, a date field, an amount of money owed, and an amount of money to charge for incorrectly (or non-performed) services.

Figure 3:
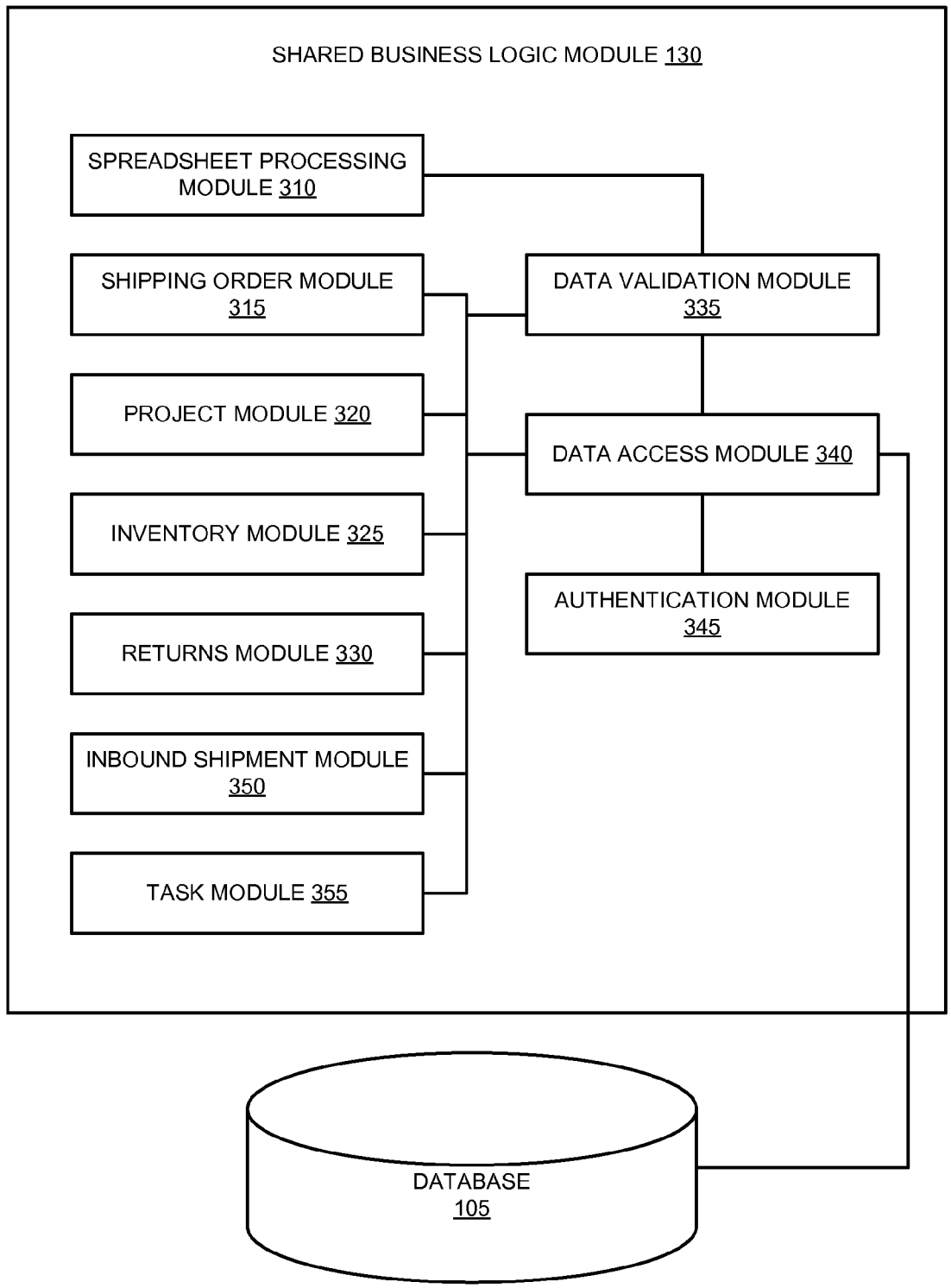
FIG. 3 illustrates a detailed view of an exemplary shared business logic module used in the online merchants to third party warehouse providers broker and order fulfillment system of FIG. 1 according to one embodiment of the invention.

FIG. 3 is a detailed view of an exemplary shared business logic module 130 according to one embodiment of the invention. With reference to FIG. 3, the shared business logic module 130 includes a library of functional program subroutines invoked by higher application layers to coordinate operations on the objects in the database 105. The shared business logic module 130 includes a spreadsheet processing module 310, a shipping order module 315, a project module 320, an inventory module 325, a returns module 330, a data validation module 335, a data access module 340, an authentication module 345, an inbound shipment module 350, and a task module 355.

The data access module 340 provides subroutines for performing basic creation, read, update, and delete operations on data in the tables of database 105. These operations are effected by adapting and transforming library function parameters and inputs to the input requirements of the underlying database 105 interface and passing those adapted inputs through to the database 105 interface.

The data validation module 335 provides higher-order subroutines which ensure that data recorded in the tables of the database 105 are valid with respect to the expected type and range of data represented.

The authentication module 345 provides a higher-order subroutine which takes as input a username and a password credential for that user, consulting the user table 205 to determine if the username/password combination is valid.

The shipping order module 315 provides subroutines for processing information related to shipping orders (both information received from the warehouses 150A-150M and the merchants 160A-160N). For example, the shipping order module 315 provides subroutines for processing shipping orders received from the merchants 160A-160N (e.g., subroutines for analyzing the shipping orders to determine the number and type of products in each shipping order, determining which of the warehouses 150A-150M store those products, causing the updating of inventory based on the shipping orders, updating or editing an existing shipping order etc.), processing warehouse shipment confirmations received from the warehouses 150A-150N, testing the validity of tracking numbers supplied by the warehouses 150A-150M as proof of shipment, cross-checking the quantity and kind of products shipped against the shipping order details table 215, adjusting inventory counts to reflect the quantities reported shipped, and recording the shipping order completion date.

The inbound shipment module 350 provides subroutines for processing information related to inbound shipments (information both received from the warehouses 150A-150M and the merchants 160A-160N). For example, the inbound shipment module 350 provides subroutines for processing inbound shipment orders received from the merchants 160A-160N (e.g., subroutines for analyzing the inbound shipment orders to determine the type and number of the products in each inbound shipment order, determining which of the warehouses 150A-150M the inbound shipment orders should be redirected, updating an existing inbound shipment order, updating the products table 220, updating the inventory table 225, etc.), processing warehouse inbound receipts received from the warehouses 150A-150M, cross-checking the quantities and kinds of products reported received with the inbound shipment details table 255, adjusting inventory counts to reflect the quantities reported received, and recording the receipt date.

The returns module 330 provides subroutines for processing warehouse returns receipts, cross-checking the quantities and kinds of products reported received with the shipping order details table 215, adjusting inventory counts to reflect the quantities reported returned, and recording the return date and condition.

The inventory module 325 provides a subroutine for performing an accounting transfer of a quantity of product stock from one inventory phase to another. The inventory module 325 further implements a finite state machine as a guard for ensuring only sensible inventory transitions are allowed.

The project module 320 provides subroutines for transitioning projects through a predetermined workflow of: bid, negotiation, acceptance, execution, and completion; storing and retrieving messages regarding the projects among the warehouses 150A-150M, the system operator 180, and the merchants 160A-160N; storing and retrieving proof of completion; and adjusting inventory to reflect the progress of the projects.

The task module 335 provides subroutines for transitioning tasks through creation and completion and storing and retrieving proof of completion.

The spreadsheet processing module 310 provides a subroutine for reading a file in comma-separated or spreadsheet format and converting it into a format suitable for input to the data validation module 335 and data access module 340.

Figure 4:
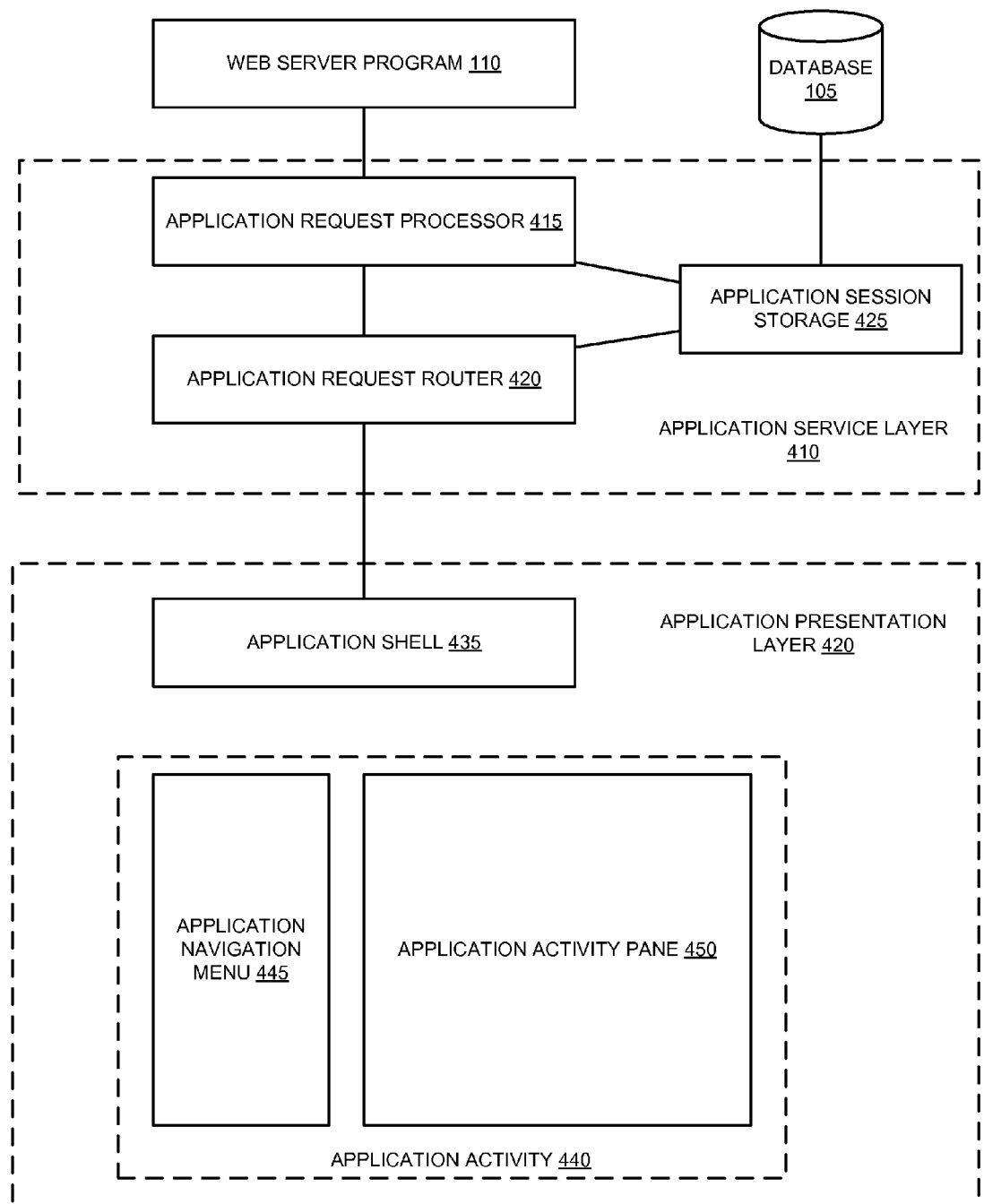
FIG. 4 illustrates a detailed view of an exemplary web application framework used in the online merchants to third party warehouse providers broker and order fulfillment system of FIG. 1 according to one embodiment of the invention.

FIG. 4 illustrates a more detailed web application framework 115 according to one embodiment of the invention. With reference to FIG. 4, the web application framework 115 includes an application service layer 410 and an application presentation layer 430.

The application service layer 410 includes an application session storage 425 for storing temporary data about current users of the system (e.g., merchants 160A-160N and/or the warehouses 150A-150M and/or the system operator 180), an application request processor 415 for validating requests from the web server 110, and an application request router 420 for dispatching requests further based on the content of those requests.

The application presentation layer 430 includes an application shell 435, which renders a visual user interface to accessing devices (e.g., the merchant access devices 165A-165N, the system operator access device 185, and the warehouse access devices 155A-155M) and submits requests based on input received from the accessing devices, an application navigation menu 445 to provide a way for users to select a particular application activity 440, and an application activity pane 450 for conveying and collecting specific information regarding the user's currently selected application activity 440.

The application session storage 425 is a store to hold temporary data related to current users of the web application framework and periodic tasks that remove expired session data from the store. In one embodiment of the invention, the application session storage 425 is a table in the database 105, each row comprising a timestamp-based primary key, the last date of interaction in the session, and a serialized list of data associated with the session, and is periodically cleaned by a task scheduled in a system task scheduler.

As previously described, the application request processor 415 validates requests received from the web server program 110. After the application request processor 415 receives a request passed by the web server program 110, the processor 415 inspects the request for the presence of a session identifier. If no identifier is present, or if the identifier does not correspond to a valid, current session (e.g., as determined by the creation timestamp on the application session) then a new application session, with a unique identifier, is created and stored in the application session storage 410, and returned to the requester as part of any response returned by the web application framework 115. Session data is retrieved from the session data store.

The application request processor further inspects the request for a valid user credential using the authentication module 345. If the request contains a valid user credential, it is stored in the session data store, associated with the session identifier. Additionally, the request is modified in such a way that future processors of the request can recognize the request as an initial login request. If the request does not contain a valid user credential, the session data is inspected for a valid user credential. If no valid user credential is found, a response is returned to the requesting device instructing the user to provide valid credentials (e.g., a valid username and password). In one embodiment of the invention, the requesting user is redirected to a login page if no valid user credential is found.

The validated session data and request data are passed to the application request router 420. After the application request router 420 receives the request passed by the web server program 110, information about the current user is retrieved using the data access module 340. The application request router 420 determines whether the user is one of the merchants 160A-160N, the system operator 180, or one of the warehouses 150A-150M.

After determining the type of user the request belongs, if the request is an initial login request, the request is modified to reflect an appropriate application name ('warehouse', 'sysop', or 'merchant', for warehouse clients, system operators, and merchants, respectively), and the 'home' application action (e.g., the warehouse home page, the system operator home page, or the merchant home page) is forwarded to the application shell 435 for rendering. If the request does not include an application name, an application action name, and application parameters, an error response is returned. In one embodiment of the invention, an error response instructs the web server program 110 to record the time and content of the request which caused the error condition, and directs the user to contact the merchants and warehouses broker and order fulfillment system 190 offline for assistance.

The application name is compared to valid application names for the type of user logged in, which are 'warehouse', 'sysop', and 'merchant' for warehouse clients, system operators, and merchants, respectively. If the application name is not valid for the current user, an error response is returned. In addition, the application action name is compared to a list of valid actions for the application name. If the application action name is not valid for the application name, an error response is returned.

If the application name and the application action name are valid, the request is passed to the module appropriate for the application, either the warehouse portal application 120, the system operator application 128, or the merchant portal application 125, depending on the application name.

The application shell 435 processes requests relayed from the application request router 420. After receiving a request, the application shell 435 inspects the request for the application name which will determine the presentation logic module that must be invoked in order to construct elements of the user interface. In one embodiment of the invention, the application name 'warehouse' implies that the warehouse portal application 120 should be consulted, the application name 'sysop' implies that the system operator application 128 should be consulted, and the application name 'merchant' implies that the merchant portal application 125 should be consulted.

Based on the application name, the application shell 435 invokes a look-up function provided by the determined presentation logic module to discover the name of the function in the presentation logic module that must be invoked to produce a list of possible activities that the user can select. This function is then invoked, and the application shell 435 constructs an application navigation menu 445 comprising instructions for the accessing device to present a set of options to a user for choosing an application activity 440, and instructions for the accessing device to capture any user selection of an activity and submit an activity request to the web server program 110. In one embodiment of the invention, application navigation menu 445 is an HTML list, and selecting an activity causes the web browser to request new activity pane content.

The request is inspected for the application action, and the application shell 435 invokes a look-up function provided by the determined presentation logic module to discover the name of the function in the presentation logic module that must be invoked to construct the application activity pane 450. This function is then invoked, and the application shell 435 constructs an application activity pane 450 which includes instructions for the accessing device to present information comprising text, tables, forms, and controls, and instructions for capturing user interaction with said text, tables, forms, and controls. In one embodiment of the invention, the application activity pane 450 is a block of dynamic HTML code.

The application shell 435 combines the constructed application navigation menu 445 and application activity pane 450 into an application page and returns a response to the accessing device with instructions to draw the application page and await further user input. In one embodiment of the invention, the application page is a complete HTML page with a dynamic menu.

Figure 5:
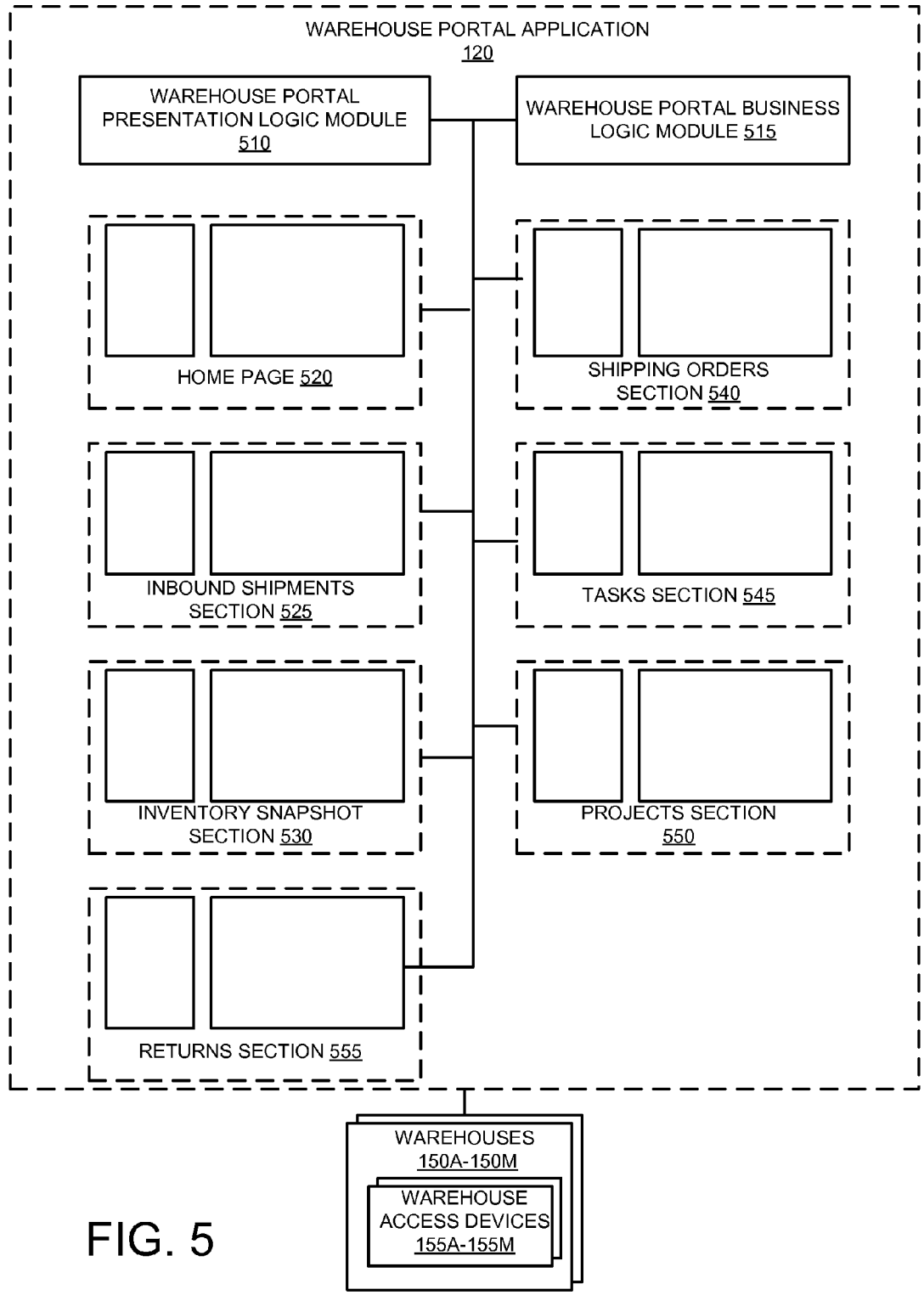
FIG. 5 illustrates a detailed view of an exemplary warehouse portal application used in the online merchants to third party warehouse providers broker and order fulfillment system of FIG. 1 according to one embodiment of the invention.

FIG. 5 illustrates a detailed view of an exemplary warehouse portal application 120 according to one embodiment of the invention. With reference to FIG. 5, the warehouse portal application 120 includes a warehouse portal presentation logic module 510 and a warehouse portal business logic module 515, which cooperate to provide the user experience and operative function of the sections of the warehouse portal application 120. In one embodiment of the invention, these sections include the warehouse portal home page 520, warehouse portal shipping orders section 540, warehouse portal inbound shipments section 525, warehouse portal projects section 570, warehouse portal tasks section 545, warehouse portal inventory snapshot section 530, and the warehouse portal returns section 555.

Each section of the application includes a presentation logic component and a business logic component which are reposed in the warehouse portal presentation logic module 510 and warehouse portal business logic module 515, respectively.

In this specification, when an embodiment of a section's functional operation or module utilization is discussed, it is construed to mean the coordinated execution of functions and subroutines from modules named therein, along with any necessary temporary storage of results of said functions needed for further computation or for use in the presentation. In this specification, when an embodiment of a section's presentation is discussed, it is construed to mean the programmatic assembly of instructions to an accessing device to render that presentation and await further user input.

The warehouse portal home page 520 provides a summary overview of all outstanding pending services requested by the merchants 160A-160N. In one embodiment of the invention, the total quantity of outstanding unexecuted outbound shipping orders, unreceived inbound shipments, unperformed tasks, and incomplete special projects are presented in the warehouse portal home page 520. In one embodiment of the invention, alongside the presentation of each outstanding pending service count, if there are any services determined to be past due, the count of past due services is presented with emphasis. The data presented on the portal home page 520 is obtained by invoking functions in the shared business logic module 130.

The warehouse portal shipping orders section 540 includes a shipping order export tool, a shipping order import tool, and a shipping order interactive completion tool. The shipping order export tool allows each warehouse client to retrieve (e.g., in spreadsheet format) a representation of unprocessed shipping orders requested of the one or more of the warehouses 150A-150M that warehouse client controls or is otherwise authorized to view as recorded by the merchants and warehouses broker and order fulfillment system 190. In one embodiment of the invention, the shipping order export tool utilizes the spreadsheet processing module 310 in conjunction with the shared business logic module 130.

The shipping order import tool allows each warehouse clients to upload (e.g., in spreadsheet format) to the merchants and warehouses broker and order fulfillment system 190 a set of one or more outbound shipping order parameters (e.g., whether the outstanding order is complete, a carrier tracking number, etc.). It should be understood that the term completed shipping orders refers to a product that has been shipped, but does not necessarily imply that the product has been successfully delivered. If any of the uploaded data is deemed invalid, an error message is presented detailing the issues encountered in validating the order data. For valid representations, the respective shipping orders are marked complete. After being marked complete, a representation of those respective shipping orders is stored in the shipping orders table 210 in the database 105, which may then be viewable and/or downloaded by the merchant(s) that created those shipping orders. The shipping order import tool utilizes the shared business logic module 130.

The shipping order interactive completion tool allows the warehouse clients to input the set of outbound shipping order parameters by marking one or more shipping orders as having been fulfilled (e.g., shipped) by providing the shipment tracking numbers and requesting that they be processed. Upon request for processing, if a carrier tracking number is deemed invalid, an indication and error message is presented detailing the issues encountered in validating the order data. For valid tracking numbers, the shipping orders are marked complete. After being marked complete, a representation of those respective shipping orders is stored in the shipping orders table 210 in the database 105, which may then be viewable and/or downloaded by the merchant(s) that created those shipping orders. In one embodiment of the invention, the tool presents a grid with the outstanding shipping orders and their details, along with a blank column for entering in a carrier tracking number, and a submission button for requesting processing. The shipping order import tool utilizes the shared business logic module 130.

The warehouse portal inbound shipments section 525 includes an inbound shipment export tool, an inbound shipment import tool, and an inbound shipment interactive completion tool. The inbound shipment export tool allows each warehouse client to retrieve (e.g., in spreadsheet format, comma-separated value format, tab-separated value format, etc.) a representation of the unreceived inbound shipments arranged by one or more of the merchants 160A-160N at the one or more warehouses 150A-150M that it controls or is otherwise authorized to operate. For example, each warehouse client may retrieve for its warehouse(s) a list of the products of one or more merchants it expects to receive at the warehouse(s), but currently has not yet received. According to one embodiment of the invention, the inbound shipment export tool utilizes the spreadsheet processing module 310 in conjunction with the shared business logic module 130.

The inbound shipment import tool allows each warehouse client to upload (e.g., in spreadsheet format, comma-separated value format, tab-separated value format, etc.) a representation of the received inbound shipments and their item quantities at the one or more warehouses 150A-150M that it controls or is otherwise authorized to operate. For example, the inbound shipment import tool allows each warehouse client to input a set of one or more inbound shipment order parameters including the types and amount of goods received. According to one embodiment of the invention, the uploaded data takes the form as a warehouse receipt. If any of the data uploaded is deemed invalid, an error message is presented detailing the issues encountered in validating the inbound shipment data. For valid representations, the respective inbound shipments are marked complete. After being marked complete, a representation of those respective inbound shipments is stored in the inbound shipment table 240 in the database 105, which may then be viewable and/or downloaded by the merchant(s) belonging to those inbound shipments. If any unexpected items and item quantities appear in the representation, they are submitted for merchant approval. The shipping order import tool utilizes the shared business logic module 130.

The inbound shipment interactive completion tool allows each warehouse client to input the set of inbound shipment order parameters by marking one or more inbound shipments as having been received at the one or more warehouses 150A-150M that it controls by providing a count of items for each product received (potentially including unexpected items) and requesting that they be processed by the warehouse portal application 120. Upon request for processing, if submitted receipt data is deemed invalid, an indication and error message is presented detailing the issues encountered in validating the inbound shipment data. For valid inbound shipment data, the inbound shipments are marked complete. After being marked complete, a representation of those respective inbound shipments is stored in the inbound shipment table 240 in the database 105, which may then be viewable and/or downloaded by the merchant(s) belonging to those inbound shipments. In one embodiment of the invention, the inbound shipment interactive completion tool presents a grid with the outstanding inbound shipments and their details, along with blank columns for entering in quantities received, a button to add a new row to the grid for indication by the user that unexpected items were received, and a submission button for requesting processing. The inbound shipment interactive completion tool utilizes the shared business logic module 130.

The warehouse portal returns section 555 includes a returns import tool and a returns interactive completion tool. The returns import tool allows warehouse clients to upload (e.g., in spreadsheet format, comma-separated value format, tab-separated value format, etc.) a representation of one or more received return shipments, the shipping orders to which they correspond, the item quantities returned, and the salability condition of said items (e.g., whether damage has caused the items to become non-salable). The items may be returned to the warehouses 150A-150M for numerous reasons (e.g., wrong delivery address, acceptance refusal, damage to the item, etc.). If any of the uploaded data is deemed invalid, an error message is presented detailing the issues encountered in validating the return shipment data. For valid representations, the shipping orders are marked returned (if the related shipping order is reported) and, the items are returned to either the good or returned inventory stock counts (e.g., in the inventory table 225 of the database 105) depending on whether the items were indicated to be salable or not, respectively. The returns import tool utilizes the shared business logic module 130.

The returns interactive completion tool allows warehouse clients to mark one or more products as having been returned by providing the product counts and salability status of items returned and requesting that the returns be processed by the warehouse portal application. Upon request for processing, if submitted returns data is deemed invalid, an indication and error message is presented detailing the issues encountered in validating the returns data. For valid returns data, the related shipping orders (if indicated) are marked returned, and the quantity of products returned is added to either the good or returned inventory count (e.g., in the inventory table 225 of the database 105), depending on the salability status indicated. In one embodiment of the invention, the returns interactive completion tool presents a search function for finding a product. Once the product is found, the tool presents blank columns for entering in quantities returned, salability status (one of 'yes' or 'no'), a field to capture the related shipping order identifier (if known), and a submission button for requesting processing. The returns interactive completion tool utilizes the shared business logic module 130.

The portal projects section 550 includes an interactive workflow tool which allows the warehouse clients to review all outstanding projects specified by a given merchant and their associated details, enter or revise a labor and materials bid on a project, enter or revise a completion date estimate on a project, send a message to the merchant or system operator regarding the project, accept or reject the project, report progress on a project, and report a project completed along with proof of completion.

In one embodiment of the invention, the interactive workflow tool of the portal projects section 550 presents a grid with the outstanding projects and their summary information to the warehouse clients, which may then select an individual project and choose to review the project in detail. The warehouse clients are then presented with additional information regarding the project including past messages exchanged with the merchant and system operator, the status of the project (e.g., one of 'new', 'awaiting merchant response', 'awaiting warehouse response', 'awaiting system operator response', 'committed', 'complete'), any proposed bid on the project and whether the bid has been accepted by the merchant and/or system operator, the products involved in the project, specific details on what is being requested, controls allowing the user to propose or revise a bid on an uncommitted project, controls allowing the user to propose or revise a completion estimate on an uncommitted project, controls allowing the user to send a new message to the merchant and/or system operator, controls allowing the user to accept (commit to) the project at the current bid, controls allowing the user to indicate progress on the project; specifically, controls for reporting how many units of products involved the project have been consumed, and how many of the desired products in the project have been created, controls allowing the user to mark a project as complete, controls allowing the user to provide a concise textual or pictoral certification of completion of a project. The interactive workflow tool of the portal projects section 550 utilizes the shared business logic module 130.

The warehouse portal tasks section 545 includes an interactive workflow tool which allows the warehouse clients to review all outstanding tasks specified by the system operator 180 or automatically identified by the system, in priority order, and see their associated details, report a task completed, and provide proof of completion. As used herein, a task is any generic service request by a system operator that is not a shipping order, inbound shipment, or special project. In one embodiment of the invention, the interactive workflow tool of the warehouse portal tasks section 545 presents a grid with the outstanding tasks and their summary information to the user, which may then select an individual task and choose to review the task in detail. The user is then presented with additional information regarding the task including the status of the task (one of 'complete' or 'incomplete'), specific details on what is being requested, controls allowing the user to mark a task as complete, controls allowing the user to provide a concise textual or pictoral certification of completion of a task.

The warehouse portal inventory snapshot section 530 includes an inventory snapshot export tool and an inventory snapshot import tool. The inventory snapshot export tool allows each warehouse client to retrieve (e.g., in spreadsheet format, comma-separated value format, tab-separated value format, etc.) a representation of all products known to the merchants and warehouses broker and order fulfillment system 190 to be in the one or more of the warehouses 150A-150M belonging to that warehouse client and their last reported quantities. According to one embodiment of the invention, the export tool utilizes the spreadsheet processing module 310 in conjunction with the shared business logic module 130 to generate the inventory snapshot. It should be understood that each of the warehouses 150A-150M may keep an internal count of the inventory it keeps, and may compare their internal inventory count with the information stored in the merchants and warehouses broker and order fulfillment system 190 to identify and correct for discrepancies.

The inventory snapshot import tool allows each warehouse client to upload (e.g., in spreadsheet format, comma-separated value format, tab-separated value format, etc.) a representation of all products in the one or more of the warehouses 150A-150M controlled or operated by that warehouse client, and their last counted quantities. If any of the uploaded data is deemed invalid, an error message is presented detailing the issues encountered in validating the inventory snapshot data. For valid representations, the respective item counts are updated. These counts are kept separate from the internal counts of the merchants and warehouses broker and order fulfillment system 190 so that discrepancies may later be identified. If any unexpected items and item quantities appear in the representation, they are submitted for merchant approval. The inventory snapshot import tool utilizes the shared business logic module 130.

In one embodiment of the invention, for each of the warehouses 150A-150M, the warehouse table 230 is augmented with a flag indicating whether each of the warehouses 150A-150M is deemed trustworthy by the system operator 180, and an additional table is added to the database 105 to serve as a submission buffer. This submission buffer includes rows corresponding one-to-one to submissions made by the warehouses 150A-150M in any section of the portal application. If the system operator 180 defines a particular one of the warehouses 150A-150M as untrustworthy, then all submissions by that warehouse are stored in a system operator approval queue for review in a system operator approval console. Then, only after being approved by the system operator 180 are any changes applied to the database 105.

Thus, the warehouse portal application 120 provides a single interface for each of the warehouses 150A-150M for reviewing all services expected of them (e.g., inbound shipment receipt, outbound shipping orders, special projects, long-term storage, etc.). This allows the warehouses 150A-150M to quickly view their assigned services which allows them to prioritize tasks. Furthermore, since previous prior art implementations require manual communication for services between the merchants 160A-160N and the warehouses 150A-150M and/or between a 3PL broker and the warehouses 150A-150M, which may become lost or arrive late, the warehouse portal application 120 minimizes mismatched expectations by providing a single interface which illustrates all services expected by that warehouse.

The warehouse portal application 120 allows the system operators (e.g., the system operator 180) of the order fulfillment system 190 to communicate with a new warehouses with no additional technology investment which allows the establishment of new warehouse partners quickly. In addition, this allows the system operators to sever or alter problematic partnerships (e.g., remove warehouses or change their relationship) and add new partnerships (e.g., add warehouses) without fears of incurring new electronic integration costs or the unreliability and difficult to track non-electronic communication. Thus, with use of the warehouse portal application 120, warehouses are fungible with respect to communication (e.g., each warehouse, regardless of their technological or physical capabilities, may communicate with the order fulfillment system 190 via the warehouse portal application 120).

Figure 6:
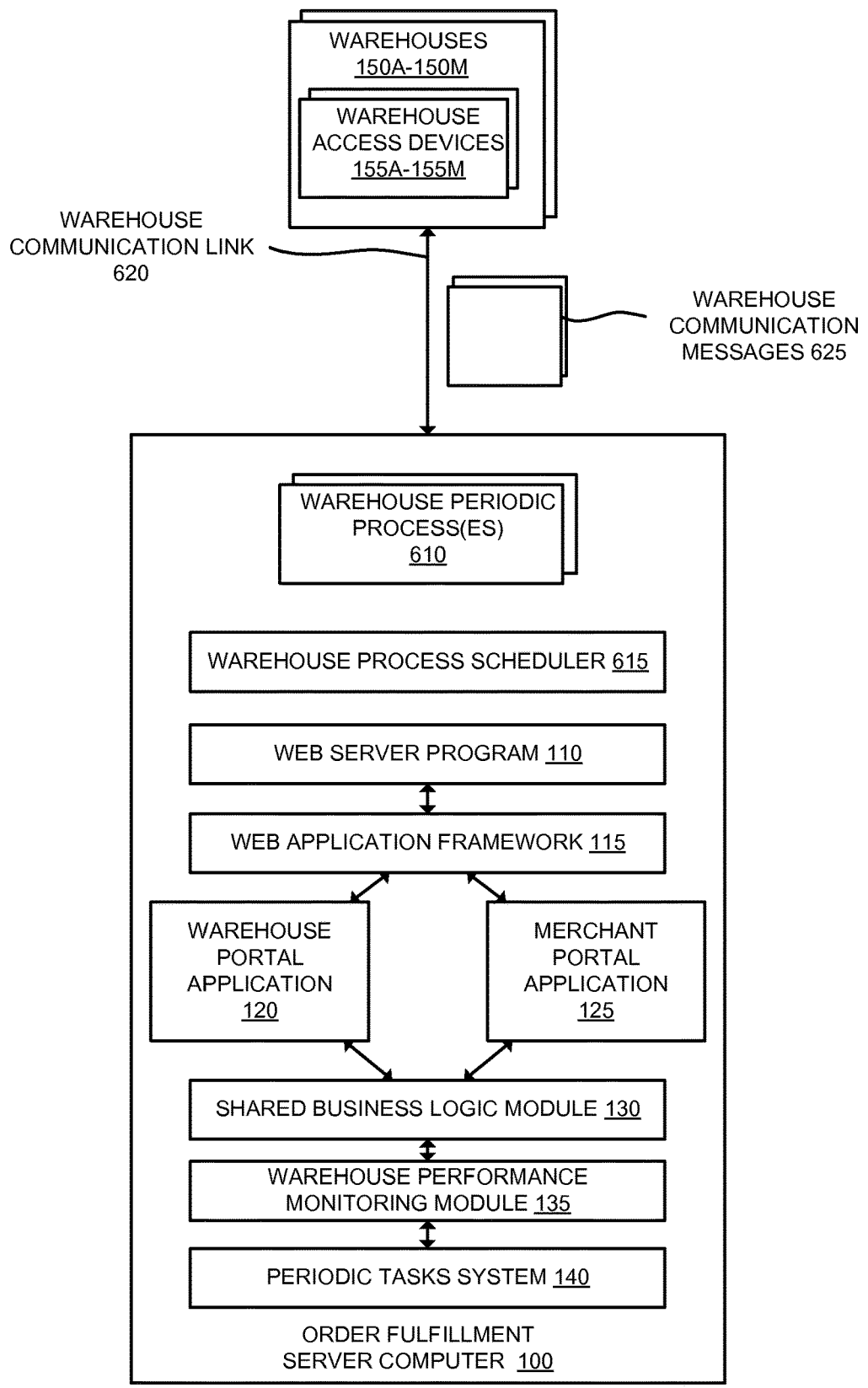
FIG. 6 illustrates an alternate embodiment of the warehouse portal application of the online merchants to third party warehouse providers broker and order fulfillment system of FIG. 1 where the information gathering functions of the warehouse portal application are supplemented with electronic data interchange according to one embodiment of the invention.

FIG. 6 is an alternate embodiment of the warehouse portal application 120 where the information gathering functions of the warehouse portal application 120 are supplemented with electronic data interchange. With reference to FIG. 6, the order fulfillment server computer 100 is augmented with one or more warehouse periodic processes 610, executed by a warehouse process scheduler 615, which provides unattended data exchange with the warehouses 150A-150M. In one embodiment of the invention the warehouse process scheduler 615 schedules data exchange with the warehouses 150A-150M upon certain events at the merchants and warehouses broker and order fulfillment system 190 (e.g., upon receiving a new or updated inbound shipment, upon receiving a new or updated shipping order, upon receiving a new or updated project, upon receiving a new or updated task, etc.). Each of the one or more warehouse periodic processes corresponds to a section of the aforementioned warehouse portal application 120.

A plurality of warehouse communication messages 625 are sent between the warehouses 150A-150M and the order fulfillment server computer 100. Each warehouse communication message 625 includes a similar representation of data which would be collected by the warehouse portal application 120 in application activities (e.g., data related to: unprocessed shipping orders, unreceived inbound shipments, outstanding projects, outstanding tasks, inventory as reported by the merchants and warehouses broker and order fulfillment system 190, etc.). In one embodiment of the invention, the warehouse communication messages 625 are comprised of lines of comma-separated values with an initial column header line indicating the purpose of each field.

A warehouse communication link 620 is constructed using a communication protocol known to provide reliable, secure exchange of messages. In one embodiment of the invention, the warehouse communication link 620 is via the File Transfer Protocol.

Figure 7:
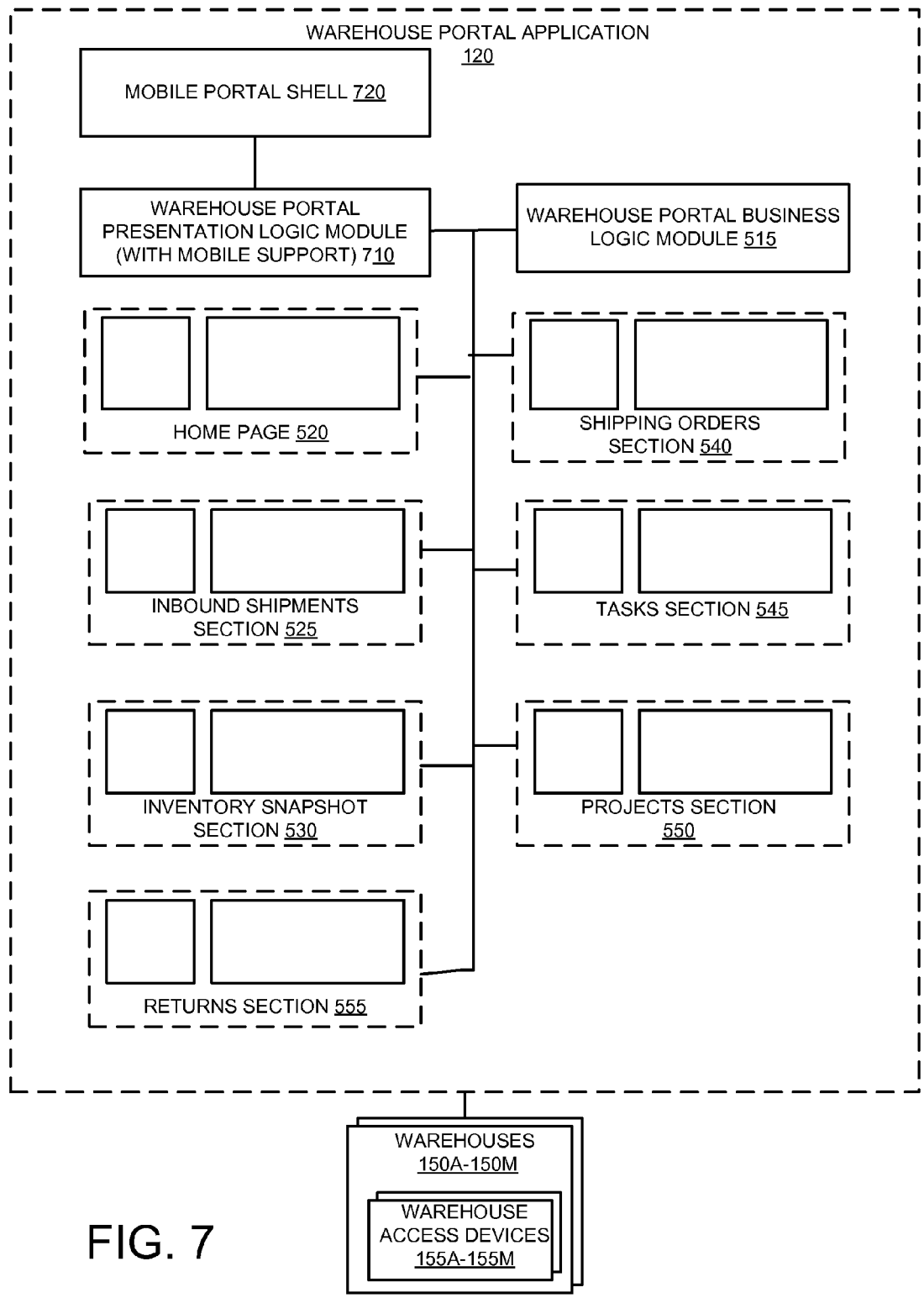
FIG. 7 illustrates an alternate embodiment of the warehouse portal application of the online merchants to third party warehouse providers broker and order fulfillment system of FIG. 1 to support mobile warehouse access devices according to one embodiment of the invention.

FIG. 7 is an alternate embodiment of the warehouse portal application 120 to support the warehouse access devices 155A-155M including mobile access devices (e.g., mobile phone, warehouse product scanner, laptop, palm tops, multimedia phones, etc.). In this embodiment, a warehouse mobile portal shell 720 functionally replaces the application shell 435, and the warehouse portal presentation logic module 710 has been augmented to provide condensed versions of each portal application activity 440, suitable to the typical constraints of a smaller display viewport.

Figure 8:
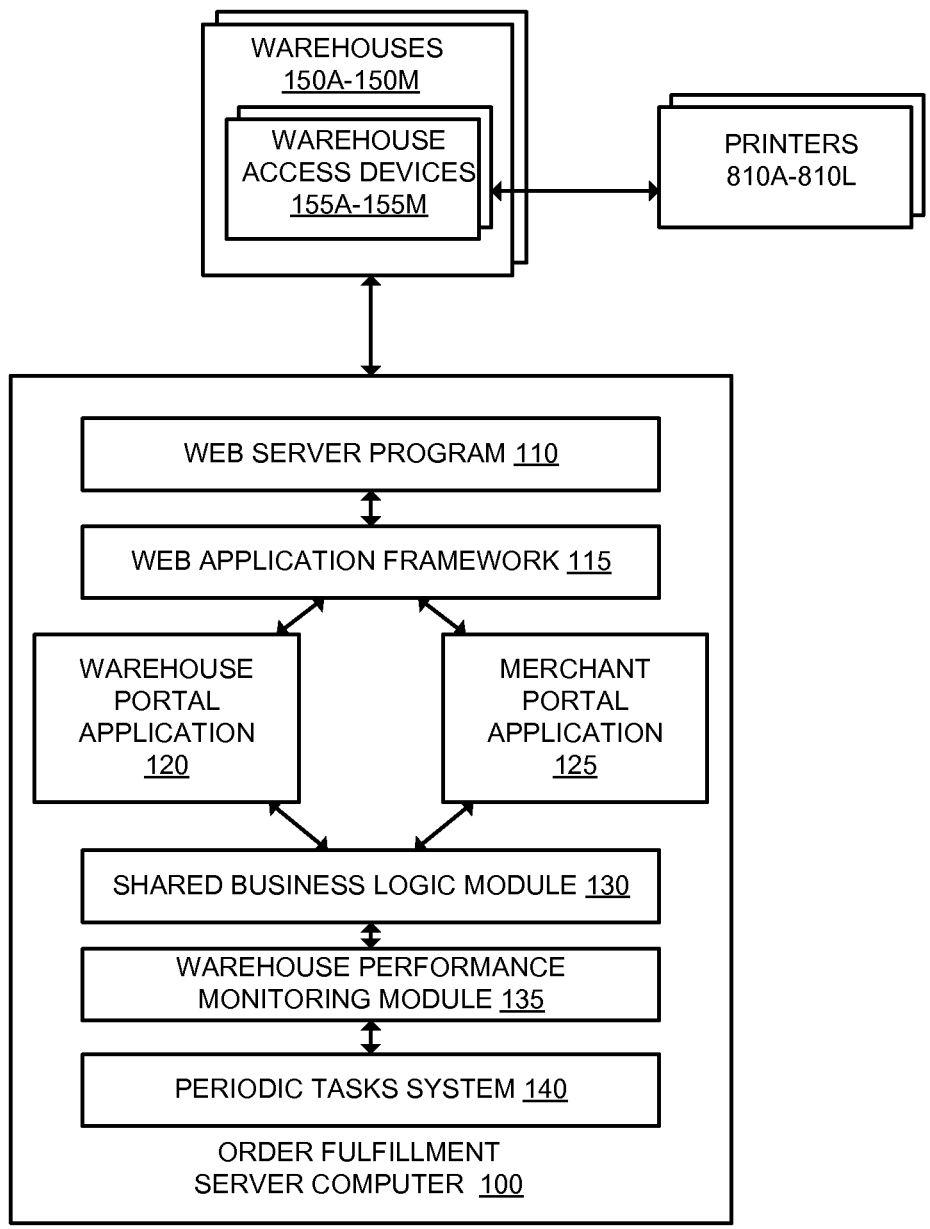
FIG. 8 illustrates an alternative embodiment of the warehouse portal application of the online merchants to third party warehouse providers broker and order fulfillment system of FIG. 1 where the warehouse access devices are operatively coupled with warehouse printers according to one embodiment of the invention.

FIG. 8 illustrates is an alternative embodiment of the warehouse portal application 120 wherein the warehouse access devices 155A-155M are operatively coupled to the warehouse printers 810A-810L. In this embodiment, the shipping orders section is augmented so that when reviewing shipping orders or shipping order details, a function is provided to allow the warehouses 150A-150M to print labels for the requested shipments.

Figure 9:
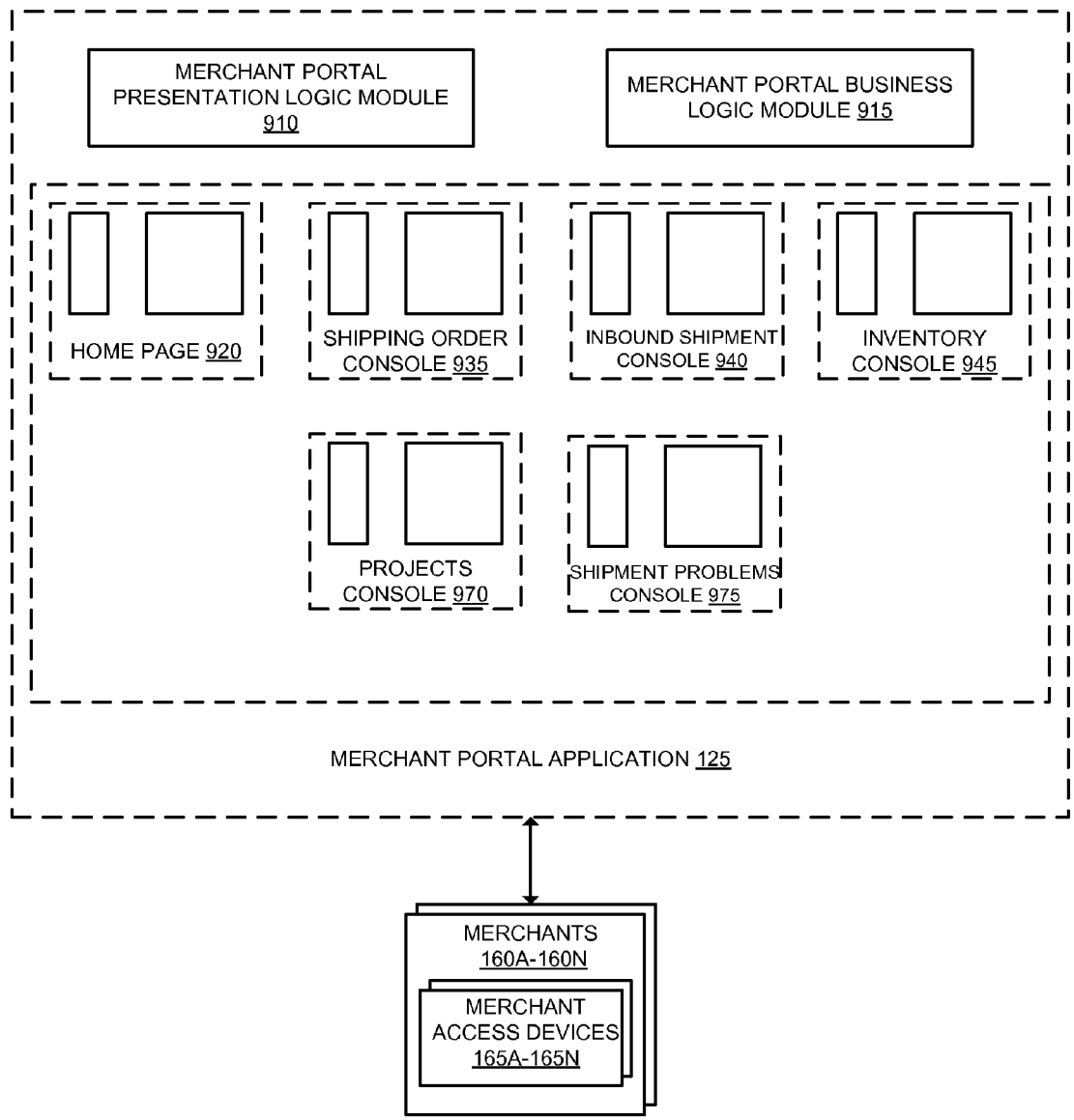
FIG. 9 illustrates an exemplary embodiment of the merchant portal application of the online merchants to third party warehouse providers broker and order fulfillment system of FIG. 1 according to one embodiment of the invention.

FIG. 9 illustrates an exemplary embodiment of the merchant portal application 125 according to one embodiment of the invention. With reference to FIG. 9, the merchant portal application 125 includes a merchant presentation logic module 910 and a merchant business logic module 915, which cooperate to provide the user experience and operative function of the sections of the merchant portal application 125. In one embodiment of the invention, these sections include the merchant home page 920, shipping order console 935, inbound shipment console 940, inventory console 945, projects console 970, and the shipment problems console 975. In one embodiment of the invention, each console is implemented in the form of a web page. Each console of the merchant portal application 125 includes a presentation logic component and a business logic component which are reposed in the merchant presentation logic module 910 and merchant business logic module 915, respectively.

In this specification, when an embodiment of a section's functional operation or module utilization is discussed, it is construed to mean the coordinated execution of functions and subroutines from modules named therein, along with any necessary temporary storage of results of said functions needed for further computation or for use in the presentation. In this specification, when an embodiment of a section's presentation is discussed, it is construed to mean the programmatic assembly of instructions to an accessing device to render that presentation and await further user input.

The merchant home page 920 provides a summary overview of all outstanding pending services requested by a particular merchant, broken down by warehouse. In one embodiment of the invention, the total quantity of outstanding unexecuted shipping orders, unreceived inbound shipments (those inbound shipments not yet received by the warehouses), and incomplete special projects are presented. The data presented on the merchant home page 920 is obtained by invoking functions in the shared business logic module 130 and accessing appropriate tables in the database 105.

The merchant shipping order console 935 provides a shipping order interactive editing tool that allows each merchant user to create new shipping orders for execution by selected ones of the warehouses 150A-150M, or edit existing shipping orders. In one embodiment of the invention, the shipping order interactive editing tool presents a form into which the merchant user may enter or modify shipping order and shipping order details information, and a submission button for requesting processing. The shipping order interactive editing tool utilizes the shared business logic module 130 and new or updated shipping order information is stored in the shipping orders table 210 of the database 105. This embodiment of the invention may be used to enter in bulk shipping orders.

In another embodiment of the invention, the merchant access devices 165A-165N of the merchants 160A-160N automatically send new or edited shipping orders to the merchants and warehouses broker and order fulfillment system 190 for processing upon receiving new or edited shipping orders. For example, responsive to buyers selecting product(s) to purchase from the merchants 160A-160N, corresponding shipping orders are transmitted to the merchants and warehouses broker and order fulfillment system 190, and processed by the merchant portal application 125. Thus, the merchant shipping order console 935 may directly receive new or edited shipping orders and process them by utilizing the shipping order module 315. For example, the merchants and warehouses broker and order fulfillment system 190 may be integrated with e-commerce shopping carts of the merchant access devices 165A-165N of the merchants 160A-160N or directly integrated with buy buttons such as PayPal Buy Now buttons. New or updated shipping order information is stored in the shipping orders table 210 of the database 105. Thus, in this embodiment of the invention, the merchant shipping order console 935 provides a real-time integration of shipping orders with the merchant access devices 165A-165N of the merchants 160A-160N.

After receiving and processing a shipping order at the merchants and warehouses broker and order fulfillment system 190, the shipping order will be accessed by the appropriate ones of the warehouses 160A-160N. The warehouses 160A-160N may access received shipping orders using the shipping order export tool of the shipping orders section 540 and/or the merchants and warehouses broker and order fulfillment system 190 may automatically transmit the shipping orders to the warehouses 160A-160N upon completing the processing of those received shipping orders.

The merchant inbound shipment console 940 provides an inbound shipment interactive editing tool that allows merchant users to create new inbound shipments and alert the warehouses of their arrival, or edit existing inbound shipments. In one embodiment of the invention, the inbound shipment interactive editing tool presents a form into which the merchant users may enter or modify inbound shipment and inbound shipment details information, and a submission button for requesting processing. The inbound shipment interactive editing tool utilizes the shared business logic module 130 and new or edited inbound shipment information is stored in the inbound shipments table 240 of the database 105.

The merchant inventory console 945 provides a tool for a particular merchant to view its data stored in the inventory table 225 in the database 105, broken down by warehouse. In one embodiment of the invention, the data is presented in a grid and warehouse-reported snapshot counts are presented alongside the system's tracked counts. The merchant inventory console 945 further provides a product interactive editing tool which allows a user to create a new product, or edit an existing product. In one embodiment of the invention, the product interactive editing tool presents a form into which the user may enter or modify key product information, and a submission button for requesting processing. The product interactive editing tool utilizes the shared business logic module 130 and new or edited product information is stored in the products table 220 of the database 105.

The merchant projects console 970 provides an interactive workflow tool, utilizing the shared business logic module 130, which allows a merchant user to review all outstanding projects and their associated details, enter or revise a project and its details, send a message to a particular one of the warehouses 150A-150M regarding the project, accept or reject a bid and completion estimate on the project, review progress on a project, and review a project's proof of completion. In one embodiment of the invention, the interactive workflow tool of the merchant projects console 970 presents a grid with the outstanding projects and their summary information. The user may select an individual project and choose to review the project in detail and then the user is presented with additional information regarding the project including past messages exchanged with that warehouse, the status of the project (one of 'new', 'awaiting merchant response', 'awaiting warehouse response', 'accepted', 'complete'), any proposed bid on the project and whether the bid has been accepted, the products involved in the project and their quantities, specific details on what is being requested, controls allowing the user to cancel a project, controls allowing the user to edit details of an uncommitted project, controls allowing the user to counter-propose a bid on an a bidded, unaccepted project, controls allowing the user to counter-propose a completion estimate on an estimated, unbidded project, controls allowing the user to send a new message to the warehouse, controls allowing the user to accept the project at the current bid and completion estimate, and controls allowing the user to provide a concise textual or pictoral certification of completion of a project.

The merchant shipment problems console 975 provides a tool for reporting to the warehouses 150A-150M an undershipment, overshipment, or damaged shipment of goods to buyers. In one embodiment of the invention, the tool provides an interface for finding an order based on any shipping order datum. After the order is identified, the user is given a grid of shipping order details where they may indicate which order details were overshipped, undershipped, or damaged, and by what quantity. Additionally, a control is provided to allow the user specify other products, not in the shipping order, which were overshipped. A control is provided for submitting the problem report, and upon submission, the shipment problem is recorded as a task for the warehouse 150A-150M that performed the shipping of the undershipment, overshipment, or shipment of damaged goods, to investigate.

The merchant portal application 125 provides the merchants 160A-160N a single interface to many warehouses (e.g., each of the warehouses 150A-150M) which may be spread throughout the world. Thus, each one of the merchants 160A-160N does not need to negotiate and integrate with each individual warehouse and does not need to develop their own order allocation, submission, and tracking system. In addition, the merchant portal application 125 provides the merchants 160A-160N a single interface to resolve most shipping problems automatically, which provides the benefit of increased customer satisfaction and reduced hassle in dealing with lost, damaged, or erroneous shipments.

Figure 10:
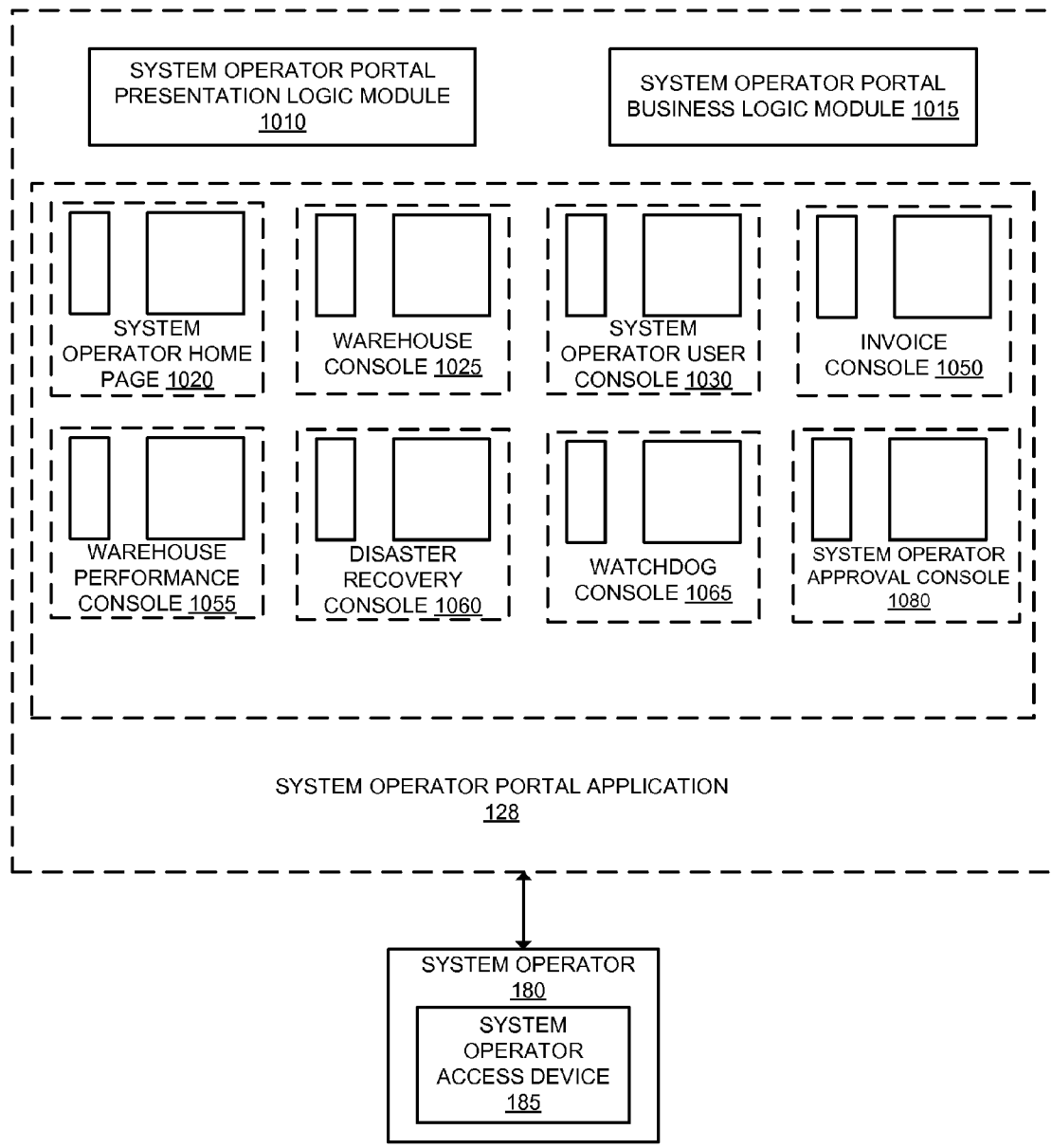
FIG. 10 illustrates an exemplary embodiment of the management portal application of the online merchants to third party warehouse providers broker and order fulfillment system of FIG. 1 according to one embodiment of the invention.

FIG. 10 illustrates an exemplary embodiment of the system operator application 128 according to one embodiment of the invention. With reference to FIG. 10, the system operator portal application 128 includes a system operator presentation logic module 1010 and a system operator business logic module 1015, which cooperate to provide the user experience and operative function of the sections of the system operator portal application 128. In one embodiment of the invention, these sections include the system operator home page 1020, warehouse console 1025, user console 1030, invoice console 1050, performance console 1055, disaster recovery console 1060, watchdog console 1065, and the system operator approval console 1080. In one embodiment of the invention, each console is implemented in the form of a web page. Each console of the system operator portal application 128 includes a presentation logic component and a business logic component which are reposed in the system operator presentation logic module 1010 and the system operator business logic module 1015 respectively.

The system operator home page 1020 provides a summary overview of all outstanding pending services requested of all warehouses, broken down by warehouse. In one embodiment of the invention, the total quantity of outstanding unexecuted shipping orders, unreceived inbound shipments (those inbound shipments not yet received by the warehouses), and incomplete special projects are presented. The data presented on the system operator home page 1020 is obtained by invoking functions in the shared business logic module 130 and accessing appropriate tables in the database 105.

The system operator user console 1030 provides a user interactive editing tool that allows the system operator 180 to create new system operators, or edit existing system operators. In one embodiment of the invention, the user interactive editing tool presents a form into which the system operator 180 may enter or modify key user information, and a submission button for requesting processing. The user interactive editing tool utilizes the shared business logic module 130, and new or updated system operator user information is stored in the users table 205 in the database 105.

The system operator warehouse console 1025 provides a warehouse interactive editing tool that allows system operators to create new warehouses (that is, indicate that new warehouses available to ship and store goods) or edit existing warehouses. In one embodiment of the invention, the warehouse interactive editing tool presents a form into which the system operator 180 may enter or modify warehouse information (e.g., the service cost structure of warehouses, location of warehouses, etc.), and a submission button for requesting processing. The warehouse interactive editing tool utilizes the shared business logic module 130 and new or updated warehouse information is stored in the warehouse table 230 in the database 105.

The warehouse performance console 1055 provides a tool for the system operator 180 to generate reports of a given warehouse's service execution performance for a given period. The tool utilizes the warehouse performance monitoring module 135 to tabulate the total count of successfully and unsuccessfully performed services in that period, and the estimated cost of all performance failures in that period, for each category of service. The tool reports the estimated net amount due for the period for each service category due to performance failures. In one embodiment of the invention, the system operator 180 is initially presented with a form for choosing one of the warehouses 150A-150M and a desired time period and a button to submit the request; then, after the performance report request is processed, the results are displayed in a grid and the system operator 180 is given the option to download the performance report in a spreadsheet or comma-separated values format, to print the performance report, or to e-mail the performance report to the system operator 180 at their defined contact e-mail address (or to any other email address).

In one embodiment, performance reports are generated periodically (e.g., based on timers in the periodic tasks system 140) of the warehouses 150A-150M that are transmitted to the system operator 180, certain ones of the warehouses 150A-150M, and/or certain ones of the merchants 160A-160N in different ways in different embodiments of the invention (e.g., the warehouse performance console 1055 periodically generates reports of the performance of those ones of the warehouses 150A-150M associated with a given merchant in regards to the goods of that merchant and the reports are transmitted only to that given merchant (e.g., via email), the warehouse performance console 1055 periodically generates reports of the performance of those ones of the warehouses 150A-150M in regards to all goods serviced by those warehouses and the reports are transmitted to the system operator 180 (e.g., via email), the warehouse performance console 1055 periodically generates reports of all the warehouse 150A-150M for all goods and these reports are periodically transmitted to the system operator 180 (e.g., via email)).

The system operator 180 may use the received performance reports when selecting a new warehouse that the merchants 160A-160N may use to store their goods. Additionally, the merchants 160A-160N may use the received performance reports when determining which warehouse to store their goods, modify the type or amount of products stored in a particular warehouse, etc.

The invoice console 1050 provides a tool for the system operator 180 to generate a reverse invoice for any of the warehouses 150A-150M for a given period. The tool utilizes the invoice generation module 1110 (which will be described in greater detail with reference to FIG. 11) to tabulate all services executed and unexecuted by a particular warehouse in the given period and calculate the cost for these services. The tool reports the total cost of each service category as well as the difference between the service cost and performance failure cost, reported as the net amount due for the period for that service category. In one embodiment of the invention, the system operator 180 is initially presented with a form for choosing one or more of the warehouses 150A-150M and a desired time period and a button to submit the request; then, after the invoice request is processed, the results are displayed in a grid and the system operator 180 is given the option to download the invoice in spreadsheet format or comma-separated values format, to print the invoice, or to e-mail the invoice to the selected one or more warehouses 150A-150M at their defined contact e-mail address. Additionally, the system operator 180 is given the option to drill down on a particular category of service and review line item charges.

The disaster recovery console 1060 provides a tool for the system operator 180 to generate disaster recovery plans 1310 (which will be described in greater detail with reference to FIGS. 13A-C) for certain ones of the warehouses 150A-150M based on all outstanding unshipped orders for those warehouses 150A-150M. The tool utilizes the shared business logic module 130 to retrieve data about all unshipped orders at that warehouse. Then, the tool utilizes the disaster recovery module 1305 to create the disaster recovery plans 1310, presents a summary of the disaster recovery plans 1310 and allows the system operator 180 to download the plans for later review. In one embodiment of the invention, the system operator 180 is initially presented with a form for choosing the affected warehouse and a desired time period and a button to submit the request; then, after the disaster recovery request is processed, the results are displayed in a grid and the system operator 180 is given the option to download the appropriate disaster recovery plan 1310 in spreadsheet format or comma-separated values format; the list of all affected orders in spreadsheet format or comma-separated values format, or a set of packing lists for affected orders in Adobe Acrobat PDF format. Further, the system operator 180 is given the option to print or e-mail the aforementioned plan or packing lists.

The watchdog console 1065 provides the system operator 180 an overview of all outstanding unfulfilled service requests and their age.

The system operator approval console 1080 provides a tool for the system operator 180 to approve the reporting of completed tasks by those of the warehouses 150A-150M which have deemed "untrustworthy" (e.g., those of the warehouses 150A-150M with an untrustworthy flag set in the warehouse table 230). In one embodiment, trustworthiness can be defined for some or all tasks (e.g., shipping orders, inbound shipments, special projects, etc.).

Figure 11A:
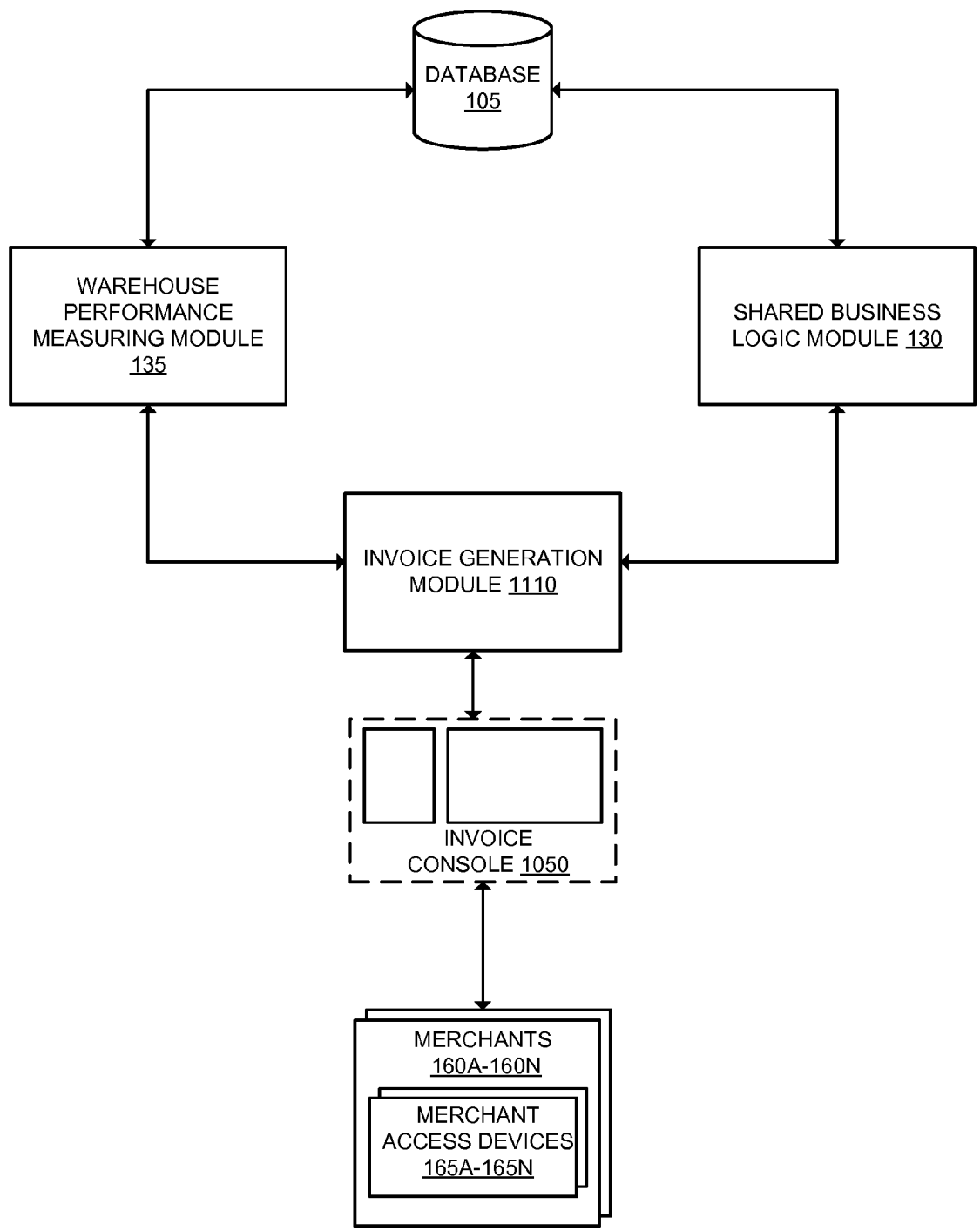
FIG. 11A illustrates an exemplary system for generating invoices according to one embodiment of the invention.

FIG. 11A illustrates an exemplary system for generating invoices according to one embodiment of the invention. With reference to FIG. 11A, the invoice generation module 1110 provides a library function which takes as input parameters a warehouse identifier (which identifies a particular one of the warehouses 150A-150M), a service period start date, and a service period end date. The invoice generation module 1110 uses the shared business logic module 130 to: retrieve information about the given warehouse, in particular the cost schedule of services provided as defined by the system operator 180 and the chargeback schedule for performance failures, retrieve information about services requested during the given time period, retrieve information about any determined performance failures in the invoice period and their cost, calculates the amount payable on services in the performance period, net of any chargebacks for performance failures, assigns each service a line item number for negotiation and reconciliation purposes, and returns the computed invoice in a data structure which may be presented (e.g., displayed in the invoice console 1050, printed, or emailed to the given warehouse). According to one embodiment of the invention, the invoice generation module 1110 is installed in the order fulfillment server 100.

Figure 11B:
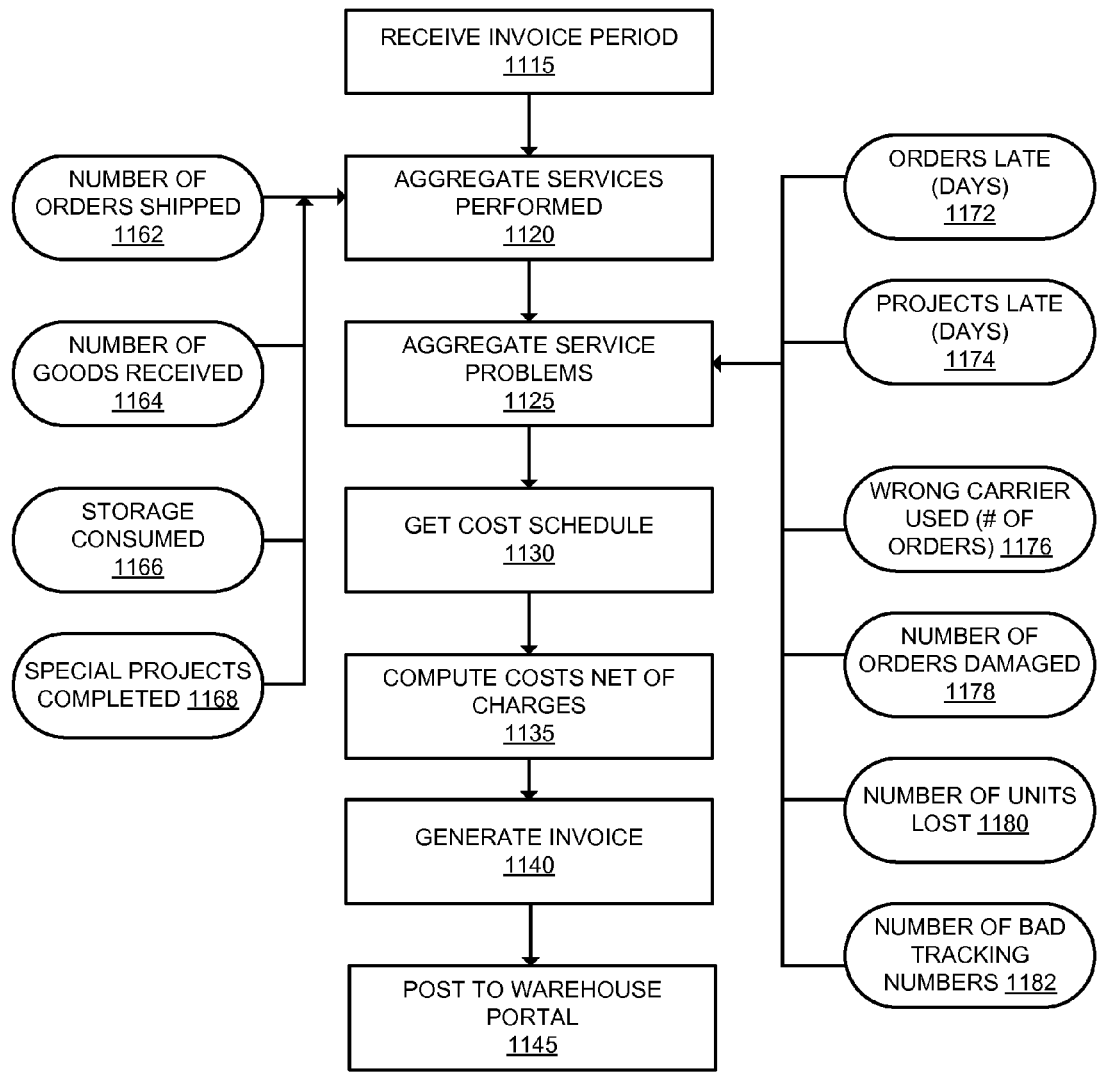
FIG. 11B is a flow diagram illustrating exemplary operations for generating invoices according to one embodiment of the invention.

FIG. 11B is a flow diagram illustrating exemplary operations for generating invoices according to one embodiment of the invention. In one embodiment, the operations described with reference to FIG. 11B are performed by the invoice generation module 1110. However, it should be understood that the operations of FIG. 11B can be performed by embodiments of the invention other than those discussed with reference to the invoice generation module 1110, and the embodiments discussed with reference to the invoice generation module 1110 can perform operations different than those discussed with reference to FIG. 11B.

At block 1115, the invoice generation module 1110 receives an invoice period. For example, the system operator 180 inputs the invoicing period (the time period in which to create the invoice for) for a particular one of the warehouses 150A-150M by using the invoice console 1050. As another example, the invoice generation module 1110 may be configured to run at predetermined times (e.g., monthly, bi-weekly, quarterly, etc.). Flow moves from block 1115 to block 1120, where the invoice generation module 1110 aggregates the services performed by that warehouse over the given time period. In one embodiment, the services performed over the time period include one or more of the following: number of orders shipped by that warehouse 1162, the number of goods received by that warehouse 1164, the amount of storage consumed at the warehouse 1166, and the number of special projects completed 1168. Flow moves from block 1120 to block 1125.

At block 1125, the invoice generation module 1110 aggregates the service problems of that warehouse over the given time period. In one embodiment, the service problems of that warehouse over the given timer period include one or more of the following: the number of orders shipped late (and the number of days those orders were shipped late) 1172, the number of special projects performed late (and the number of days those projects were late) 1174, the number of orders where the incorrect carrier was used 1176, the number of orders that included damaged goods 1178, the number of goods lost by the warehouse 1180, and the number of orders with bad tracking numbers 1182. Flow moves from block 1125 to block 1130.

The invoice generation module 1110 may determine the number of orders shipped late by comparing information stored in the database 105 (e.g., the date the orders were created, the date the orders were supposed to ship, and the date the orders were actually shipped). Similarly, since the database 105 stores information on the special projects, the carrier requested for shipping, the carrier used for shipping (as reported by the warehouse along with the tracking number), the orders which included damaged goods, the number of goods that were lost by the warehouse, the invoice generation module 1110 may determine the number of special projects performed late, the number of orders where the incorrect carrier was used, the number of orders where the incorrect carrier was used, the number of orders that included damaged goods, and the number of goods lost by the warehouse, and the number of orders with bad tracking numbers.

At block 1130, the invoice generation module 1110 gets the cost schedule previously negotiated with that warehouse. For example, the cost schedule includes the fees for correctly performed services (e.g., the contracted price based on the number of orders shipped, the number of goods received, the amount of storage space consumed, cost for special projects, etc.) as well as the cost to remedy erroneously performed or non-performed services. Flow moves from block 1130 to block 1135.

At block 1135, the invoice generation module 1110 computes the costs net the charges. For example, the invoice generation module 1110 reduces the amount of money owed to the warehouse by an amount of money caused by errors (service problems) of the warehouse. The amount of money that is reduced may be calculated differently in different embodiments of the invention (e.g., it may be based on a pre-defined schedule (e.g., each day an order is shipped late is a reduction of $10.00), it may be based on actual charges (e.g., the amount of money to fix a problem), etc.). Flow moves from block 1135 to block 1140.

At block 1140, the invoice generation module 1110 generates an invoice which includes the amount of money owed to the warehouse and the amount of money which has been credited to the system operator for the problems caused by the warehouse for the time period. Flow moves from block 1140 to block 1145, where the invoice is posted to the warehouse portal application 120 (e.g., the data for the reverse invoice is stored in the reverse invoice table 265 of the database 105) and/or emailed to the warehouse.

The invoice generation module 1110 allows the system operator 180 (or the order fulfillment system 190) to generate reverse invoices for the warehouses 150A-150M for only those services which have been performed correctly with credits for services performed incorrectly. This allows for an accurate reduction of costs which would otherwise be difficult to calculate in an unverifiable warehouse-provided invoice. In other words, since the order fulfillment system 190 monitors the shipments, special projects, tasks, etc., of the warehouses 150A-150M, the system operator 180 will know what the warehouses have performed correctly, what (and to what extent) the warehouses have performed incorrectly, the amount of money owed for those services minus credits for incorrectly performed services, and the system operator 180 does not need to rely on a warehouse-provided invoice which may be unreliable and unverifiable.

Figure 12:
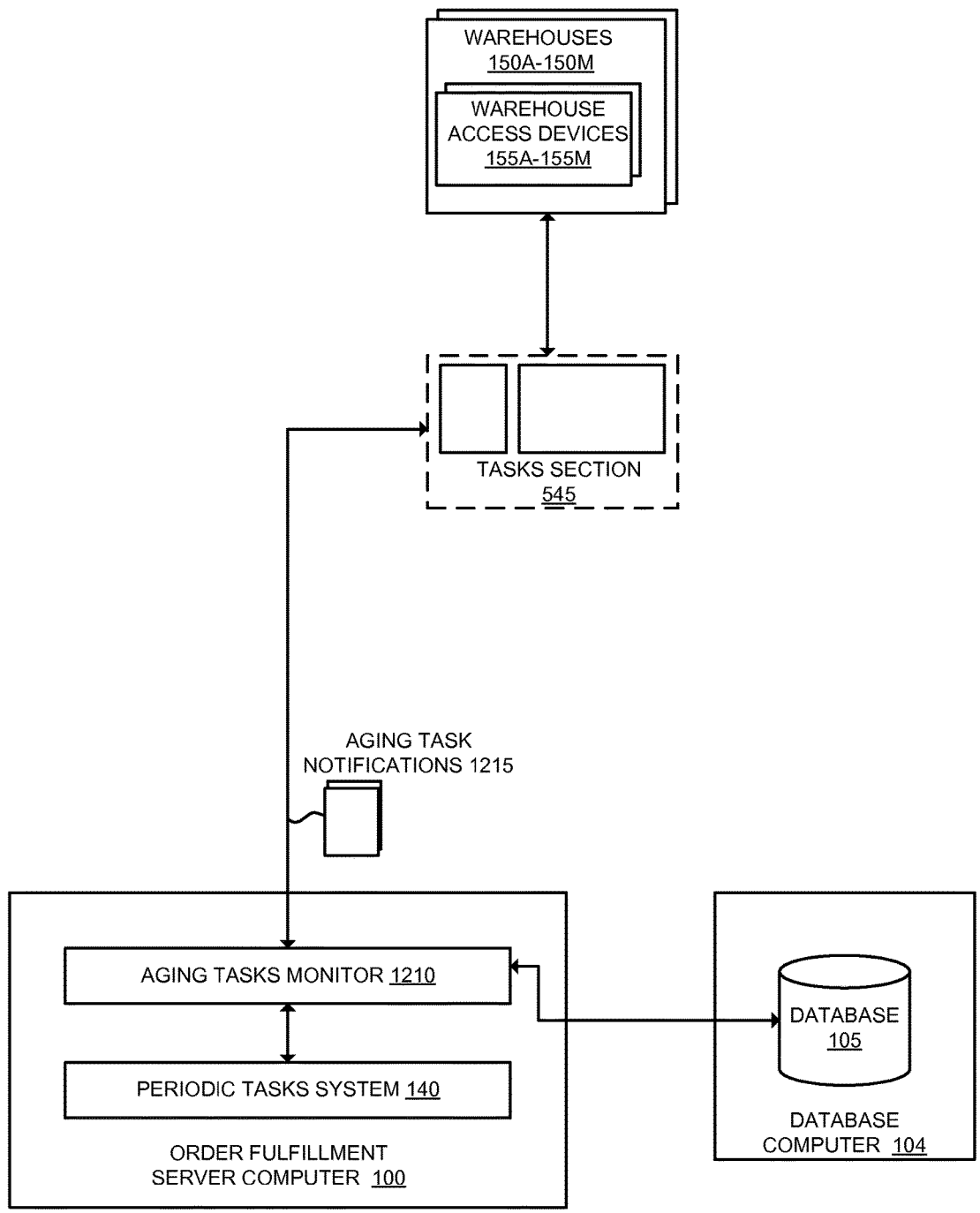
FIG. 12 illustrates an exemplary system for monitoring aging tasks of the warehouses according to one embodiment of the invention.

FIG. 12 illustrates an exemplary system for monitoring aging tasks of the warehouses 150A-150M according to one embodiment of the invention. With reference to FIG. 12, the aging task monitor 1210 monitors the aging tasks 1215 of the warehouses 150A-150M, and notifies those warehouses of potential nonperformance (e.g., if a package has not been shipped on time, etc.) through aging task notifications 1220. The aging task monitor 1210 is scheduled to be executed as a periodic task by the periodic tasks system 140.

In one embodiment of the invention, the aging task monitor 1210 is executed daily (e.g., for each of the warehouses 150A-150M, at midnight in the time zone of that warehouse). The aging task monitor 1210 utilizes the shared business logic module 130 to review all outstanding requested warehouse services that have not been completed by their expected due date, and which have not previously been determined late. For each such late task, the aging task monitor 1210 creates a new aging task notification 1220. In one embodiment of the invention the aging task notification is displayed on the portal tasks section 545 of a given warehouse, while in other embodiments of the invention each aging task notification 1220 is emailed to the appropriate warehouse 150A-150M. According to one embodiment of the invention, the aging task monitor 1210 is installed in the order fulfillment server 100.

Figure 13A:
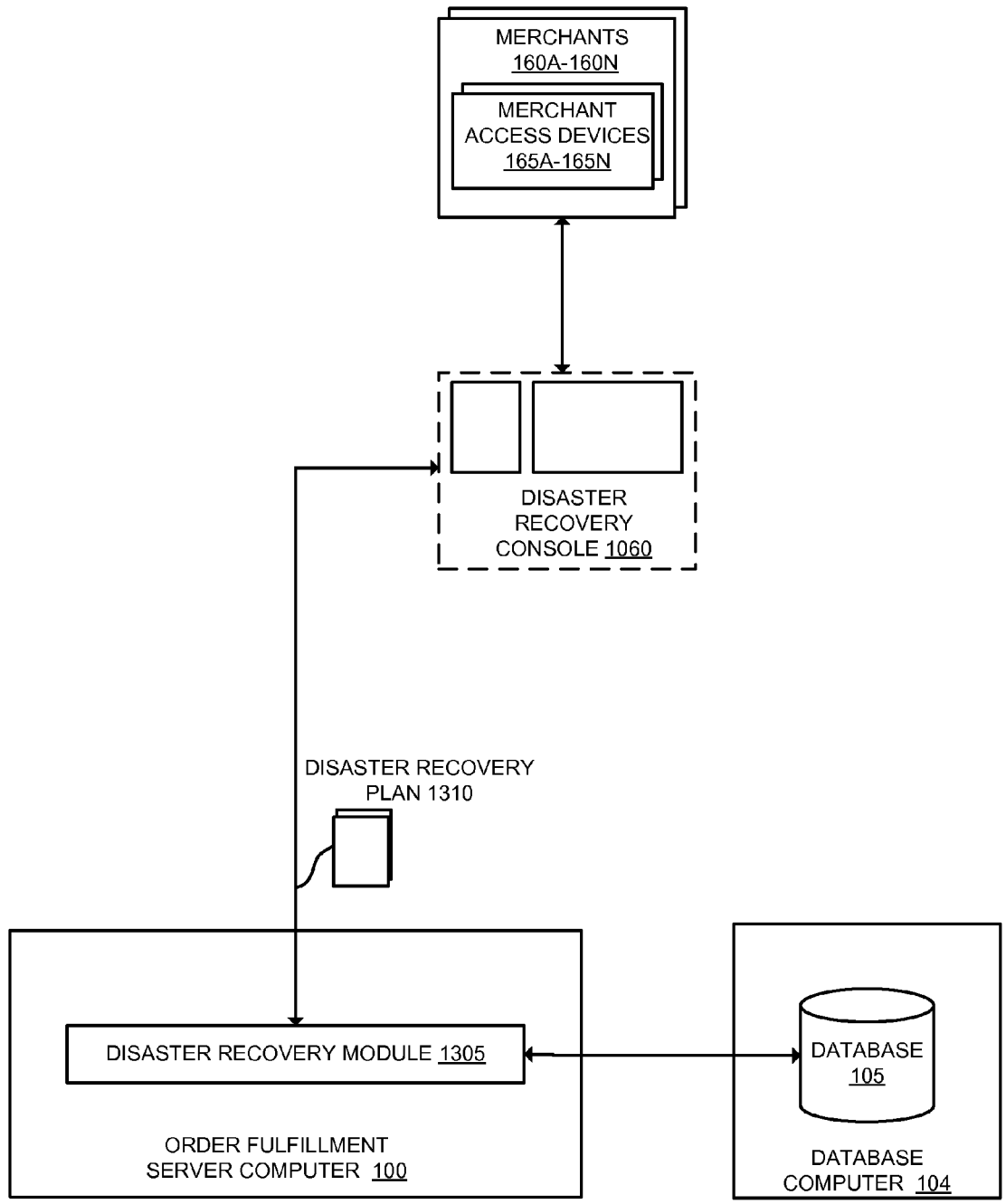
FIG. 13A illustrates an exemplary disaster recovery system according to one embodiment of the invention.

FIG. 13A illustrates an exemplary disaster recovery system according to one embodiment of the invention. With reference to FIG. 13A, the warehouse disaster recovery system includes a disaster recovery module 1305 providing a subroutine to generate and execute a disaster recovery plan 1310. Given as input the identifier of a failed warehouse and the date of last known processed shipping order, the disaster recovery module 1305 retrieves all outstanding shipping orders and shipping order details since that date, sorts the set of shipping orders in descending order of promised delivery date, with ties broken by higher product retail value of shipped items, and creates a disaster recovery plan 1310 including the list of all affected shipping orders and their details and a proposed re-routing of the orders based on known inventory availability. Given as input a generated disaster recovery plan 1310, the disaster recovery module 1305 iterates through the disaster recovery plan 1310 to identify each proposed order. For each proposed order in the plan, the order is modified so that its shipping warehouse is changed to the proposed new warehouse and the order's expected delivery date is updated to reflect the re-routing. According to one embodiment of the invention, the disaster recovery module 1305 is installed in the order fulfillment server 100.

Figure 13B:
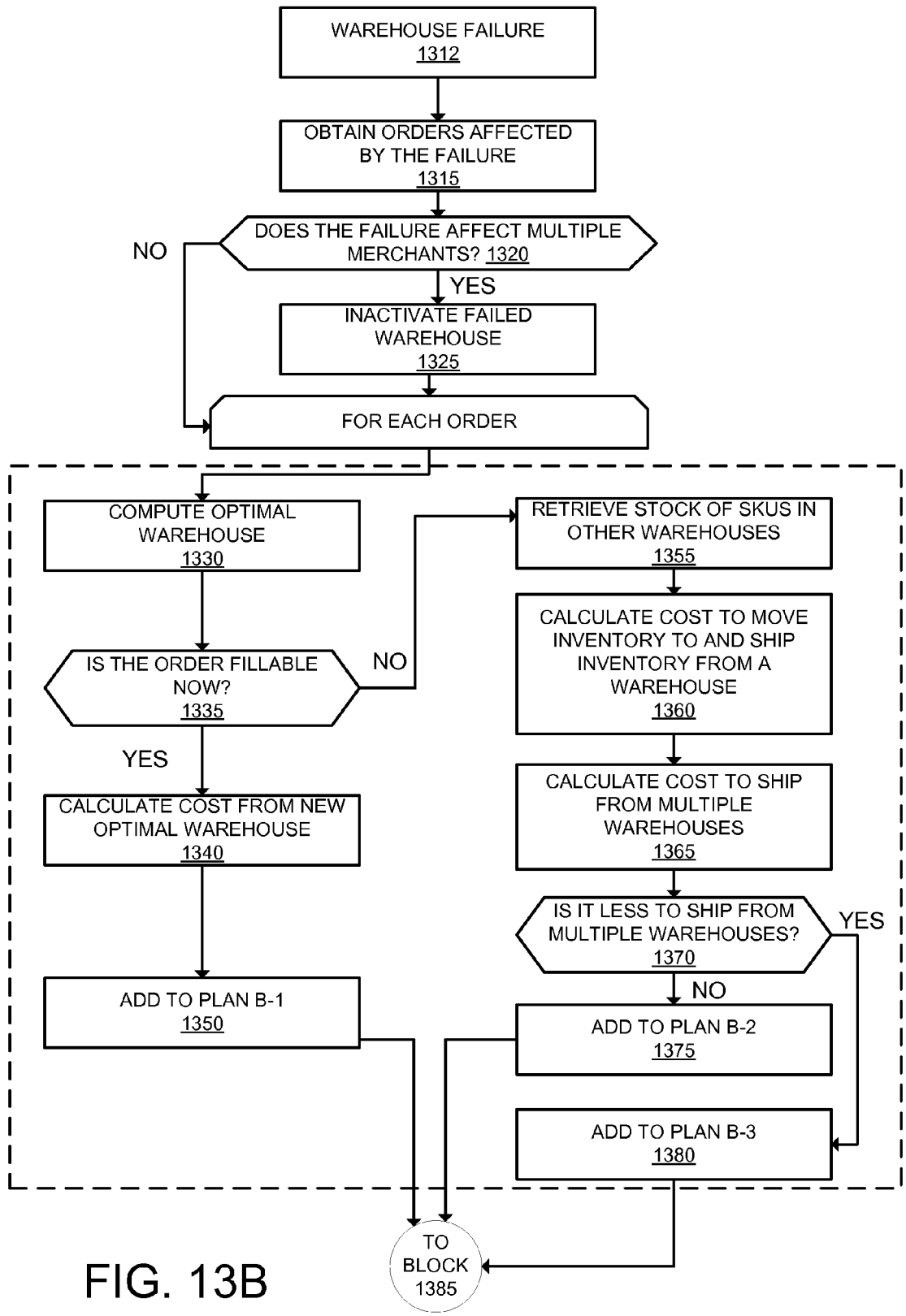
FIGS. 13B and 13C are flow diagrams illustrating exemplary operations for recovering from disasters according to one embodiment of the invention.
Figure 13C:
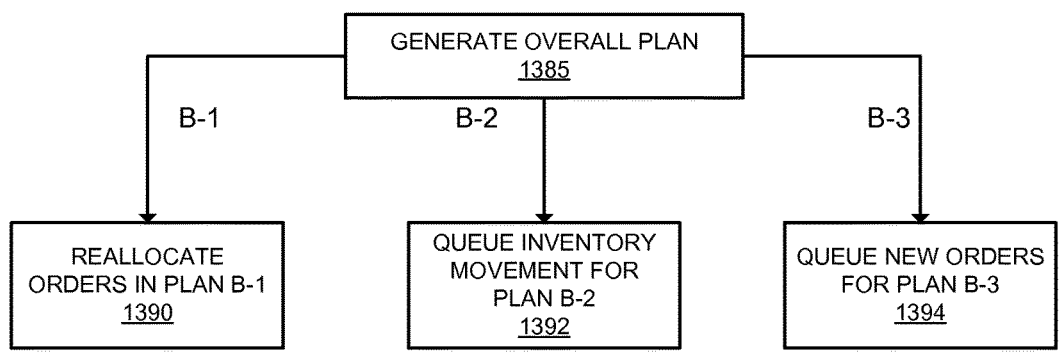

FIGS. 13B and 13C are flow diagrams illustrating exemplary operations for recovering from disasters according to one embodiment of the invention. In one embodiment, the operations described with reference to FIGS. 13B and 13C are performed by the disaster recovery module 1305. However, it should be understood that the operations of FIGS. 13B and 13C can be performed by embodiments of the invention other than those discussed with reference to the disaster recovery module 1305, and the embodiments discussed with reference to the disaster recovery module 1305 can perform operations different than those discussed with reference to FIGS. 13B and 13C.

At block 1312, one of the warehouses 150A-150M has experienced a failure and is unable to complete shipping order(s). It should be understood that the failure may affect multiple merchants (e.g., a natural disaster such as a flood, fire, earthquake, tornado, etc.) or a single merchant (e.g., inventory is stolen, lost, damaged during shipping, etc.). The warehouse is determined to be experiencing a failure when the periodic tasks system 140 observes a threshold amount of unshipped orders from the warehouse and/or if the system operator 180 receives notice of a problem from the warehouse (typically through a phone call or email, or through input into the warehouse portal application 120). Flow moves from block 1312 to block 1315, where the disaster recovery module 1305 obtains the shipping orders that are affected by the failure (e.g., those shipping orders which have not been completed and goods have not been shipped). For example, the disaster recovery module 1305 accesses the shipping order table 210 to determine the outstanding shipping orders that are affected by the failure of the warehouse. Flow then moves to block 1320.

At block 1320, the disaster recovery module 1305 determines whether the failure affects multiple merchants. If the failure affects multiple merchants, then flow moves to block 1325 where the disaster recovery module 1305 inactivates the failed warehouse. For example, the disaster recovery module 1305 marks the warehouse as "failed" in the warehouse table 230 of the database 105 in order to prevent the merchants 160A-160N from using the failed warehouse in the future. Flow moves from block 1325 to block 1330. If the failure affects a single merchant, then flow moves directly to block 1330.

For each outstanding order, the operations described in reference to blocks 1330-1380 are performed. At block 1330, the disaster recovery module 1305 computes the optimal warehouse to complete the outstanding order. The optimal warehouse may be calculated differently in different embodiments of the invention (e.g., the warehouse with the most available stock of the goods of that order, the warehouse closest to the shipping address, and the warehouse with the maximum available stock in the country of the shipping address with ties broken by proximity to the shipping address. It should be understood that the optimal warehouse may be operated by a different third party warehouse provider than the warehouse experiencing a failure. Flow moves from block 1330 to block 1335.

At block 1335, the disaster recovery module 1305 determines if the shipping order can be fulfilled by the optimal warehouse. If the shipping order can be fulfilled, then flow moves to block 1340 where the disaster recovery module 1305 calculates the cost to ship the order from the optimal warehouse. Flow moves from block 1340 to block 1350 where the shipping order is added to disaster recovery plan B-1. If the shipping order cannot be fulfilled by the optimal warehouse, then flow moves to block 1355.

At block 1355, the disaster recovery module 1305 retrieves the stock of SKUs in other ones of the warehouses 150A-150M. Flow moves from block 1355 to block 1360, where the disaster recovery module 1305 calculates the cost to move inventory to one of those warehouses and ship inventory from one of those warehouses to fulfill the shipping order. Flow moves from block 1360 to block 1365, where the disaster recovery module 1305 calculates the cost to ship the goods from multiple warehouses. Flow moves from block 1365 to block 1370, where the disaster recovery module 1305 determines whether it is less expensive to ship from the multiple warehouses as compared to shipping from one warehouse. If it is, then flow moves to block 1380 where that shipping order is added to disaster recovery plan B-3. If it is not cheaper, then flow moves to block 1375 where that shipping order is added to disaster recovery plan B-2. Control flows from blocks 1350, 1375, and 1380 to block 1385 (of FIG. 13C).

At block 1385, the disaster recovery module 1305 generates the overall shipping orders. For plan B-1, the disaster recovery module 1305 reallocates the shipping orders from the failed warehouse to the optimal warehouse. In one embodiment, the system operator 180 contacts the optimal warehouse to determine when the relocated orders have been shipped and receives their shipping information, the failed warehouse is notified to cancel those shipping orders, and those shipping orders are moved into the optimal warehouse (s) queue. For plan B-2, the disaster recovery module 1305 queues inventory movement to move the goods to the selected warehouse. For plan B-3, the disaster recovery module 1305 queues new shipping orders.

The disaster recovery module 1305 allows recovery from a warehouse disaster (e.g., fire, flood, earthquake, tornado, hurricane, power disruption, etc.) with minimal input from the system operator 180. Therefore, recovering from warehouse disasters occurs quickly which provides the benefit of quickly eliminating service interruptions that would otherwise cost revenue and merchant goodwill. Furthermore, since a warehouse disaster may affect many different merchants each having shipped different goods, the disaster recovery module 1305 allows recovery for each of those merchants in a timely fashion which would otherwise be a lengthy and intensive manual process.

Figure 14A:
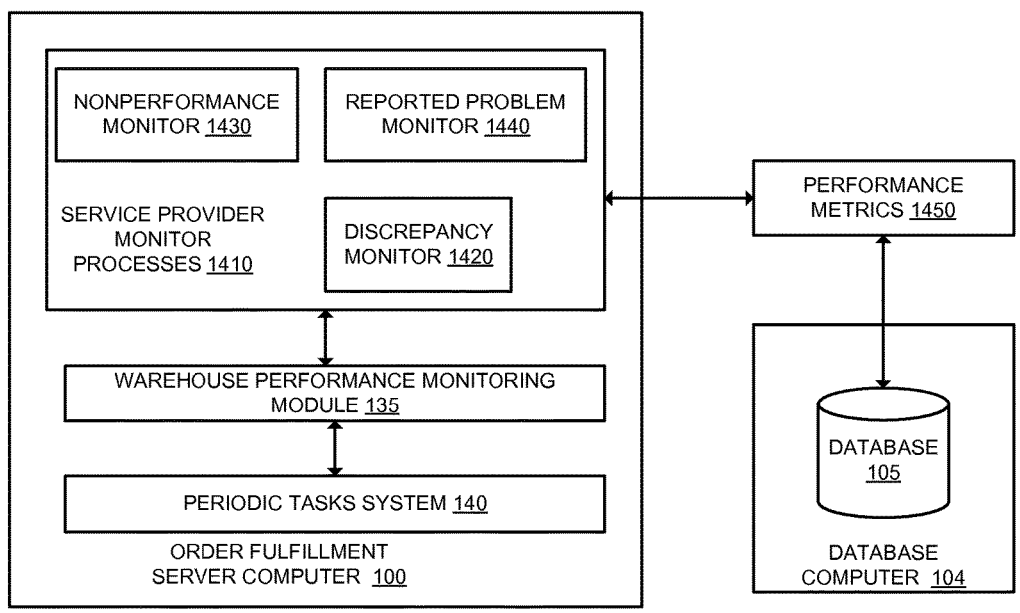
FIG. 14A illustrates an exemplary warehouse performance measurement system according to one embodiment of the invention.

FIG. 14A illustrates an exemplary warehouse performance measurement system according to one embodiment of the invention. With reference to FIG. 14A, the warehouse performance measurement system includes a warehouse performance monitoring module 135 which provides a set of one or more warehouse monitor processes 1410, executed by the periodic tasks system 140, which utilize the shared business logic module 130 and collectively review all completed warehouse service requests not yet assessed for performance or for which new performance information has become available. For each such request, the warehouse performance monitoring module 135 evaluates the performance metrics 1450 of the completed service and stores the performance metrics 1450 in the performance measurement table 250 of the database 105.

The warehouse monitor processes 1410 includes a discrepancy monitor 1420 for supervising warehouse discrepancy conditions in inventory count, a nonperformance monitor 1430 for supervising warehouse nonperformance conditions and warehouse 140 error conditions in shipping order execution, and a reported problem monitor 1440, for supervising warehouse nonperformance conditions and warehouse error conditions in shipping order and project execution.

In one embodiment of the invention, for shipping orders, the performance metrics 1450 include (in descending order of contribution to the metric), the correctness of items shipped (as determined by any reported shipping problems), the correctness of the quantities of items shipped (as determined by any reported shipping problems), the suitability of the packaging used (as determined by any reported shipping problems) the time lapsed in business days between the shipping order request and the shipping order execution, the correctness of the shipping carrier used by a given one of the warehouses 150A-150M, the correctness of the shipping carrier service level used by a given one of the warehouses 150A-150M.

In one embodiment of the invention, for inbound shipments, the performance metrics 1450 include (in descending order of contribution to the metric) the time lapsed in business days between arrival of the inbound shipment at a given one of the warehouses 150A-150M and the time the receipt is submitted.

In one embodiment of the invention, for projects, the performance metrics 1450 include (in descending order of contribution to the metric) the correctness of the project output (as determined by any reported shipping problems), and the time lapsed in business days between the committed completion date and the actual date, if the project was late.

In one embodiment of the invention, for tasks, the performance metrics 1450 include (in descending order of contribution to the metric) the time lapsed in business days between the task creation date and the actual date.

In one embodiment of the invention, for inventory snapshots, the performance metrics 1450 include (in descending order of contribution to the metric), unit deviation between the count of inventory as tracked internally by the merchant business logic module 915 and the count of inventory as reported by a given warehouse in inventory snapshot submissions.

Figure 14B:
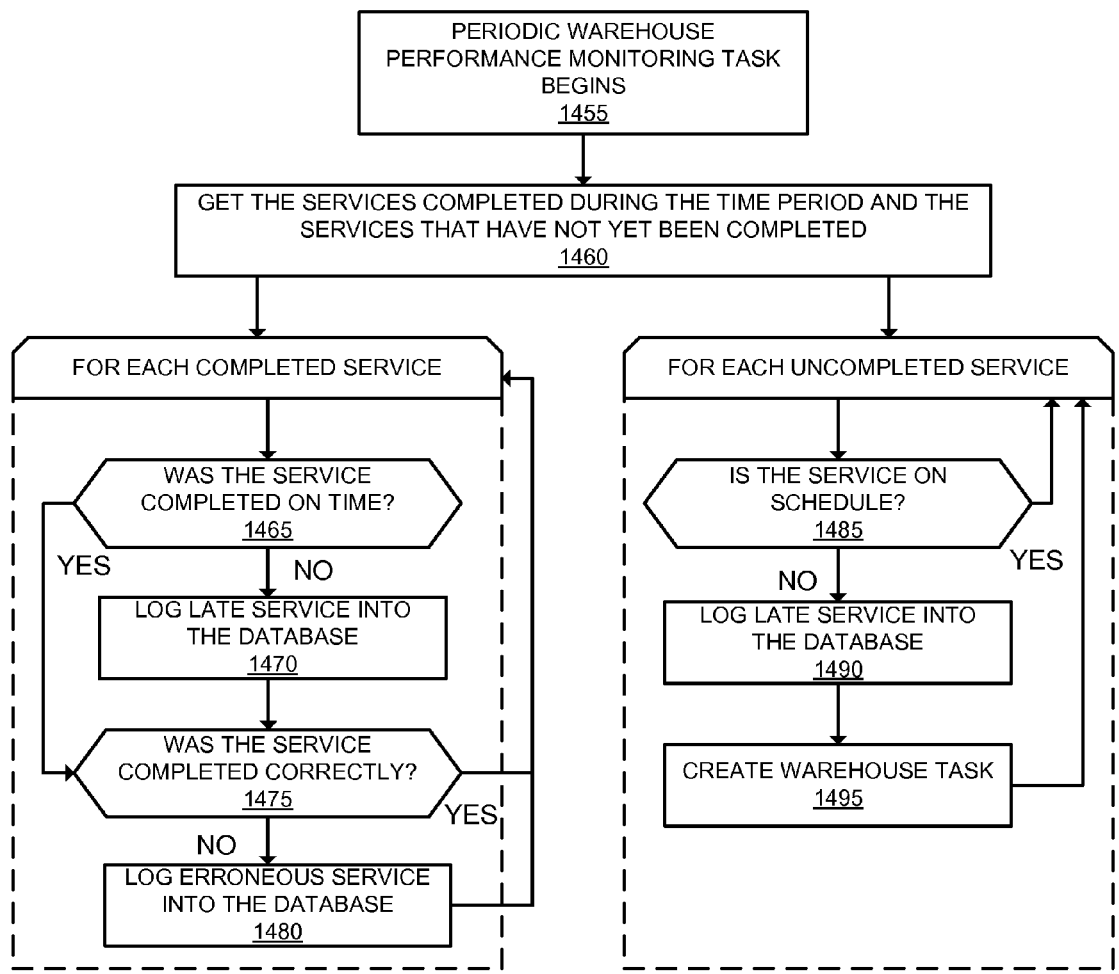
FIG. 14B is a flow diagram illustrating exemplary operations for monitoring performance of the warehouses according to one embodiment of the invention.

FIG. 14B is a flow diagram illustrating exemplary operations for monitoring performance of the warehouses 150A-150M according to one embodiment of the invention. In one embodiment, the operations described with reference to FIG. 14B is performed by the warehouse performance monitoring module 135. However, it should be understood that the operations described with reference to FIG. 14B can be performed by embodiments of the invention other than those discussed with reference to the warehouse performance monitoring module 135, and the embodiments discussed with reference to the warehouse performance monitoring module 135 can perform operations different than those discussed with reference to FIG. 14B.

At block 1455, the periodic warehouse performance monitoring task begins executing the warehouse performance monitoring module 135. The period may be configured by the system operator 180. In one embodiment, the warehouse performance monitoring module 135 monitors a single warehouse at a time, while in other embodiments the warehouse performance monitoring module 135 monitors each of the warehouses 150A-150M. For purposes of the following description, the warehouse performance monitoring module 135 monitors a single one of the warehouses 150A-150M.

Flow moves from block 1455 to block 1460, where the periodic warehouse performance monitoring module 135 retrieves the services completed by the warehouse during the time period and the services that have been assigned to the warehouse but have not yet been completed by the warehouse. The services may include one or more of the following: inbound shipments, outbound shipments, and special projects. For each completed service, flow moves to block 1465. For each uncompleted service, flow moves to block 1485.

At block 1465, the periodic warehouse performance monitoring module 135 determines whether the service was completed on time (e.g., by analyzing the data in the inbound shipments table 240, the shipping orders table 210, and/or the projects table 245). If the service was not completed on time, then flow moves to block 1470, where the service is logged as late into the database 105 (e.g., in the performance data table 250). Flow moves from block 1470 to block 1475.

If the service was completed on time, then flow moves to block 1475, where the periodic warehouse performance monitoring module 135 determines whether the service was completed correctly. For example, the warehouse performance monitoring module 135 may determine whether the tracking number associated with a shipment is valid, whether the carrier used matches the carrier requested, whether an erroneous shipment and/or damage has been reported by a recipient, etc. If the service was completed correctly, then the next completed service is selected. If the service was not completed correctly, then flow moves to block 1480 where the service is logged as erroneous in the database 105 (e.g., in the performance data table 250). The next completed service, if any exists, is then selected.

At block 1485, the warehouse performance monitoring module 135 determines whether the service is on schedule. If the service is not on schedule, flow moves to block 1490 where the service is logged as late into the database 105. Then flow moves from block 1490 to block 1495 where the warehouse performance monitoring module 135 creates a task for the warehouse to alert the warehouse to perform the service. If the service is on schedule, then the next uncompleted service, if any exists, is selected.

The warehouse performance monitoring module 135 allows the order fulfillment system 190 to track performance of the warehouses 150A-150M automatically. The performance metrics obtained from the warehouse performance monitoring module 135 may be used by the system operator 180 when evaluating the warehouses 150A-150M (e.g., to determine whether to continue the relationship with those warehouses, negotiate contracts with those warehouses, etc.). Additionally, the warehouse performance monitoring module 135 collects data which is used to when generating the reverse invoices as previously described.

Figure 15:
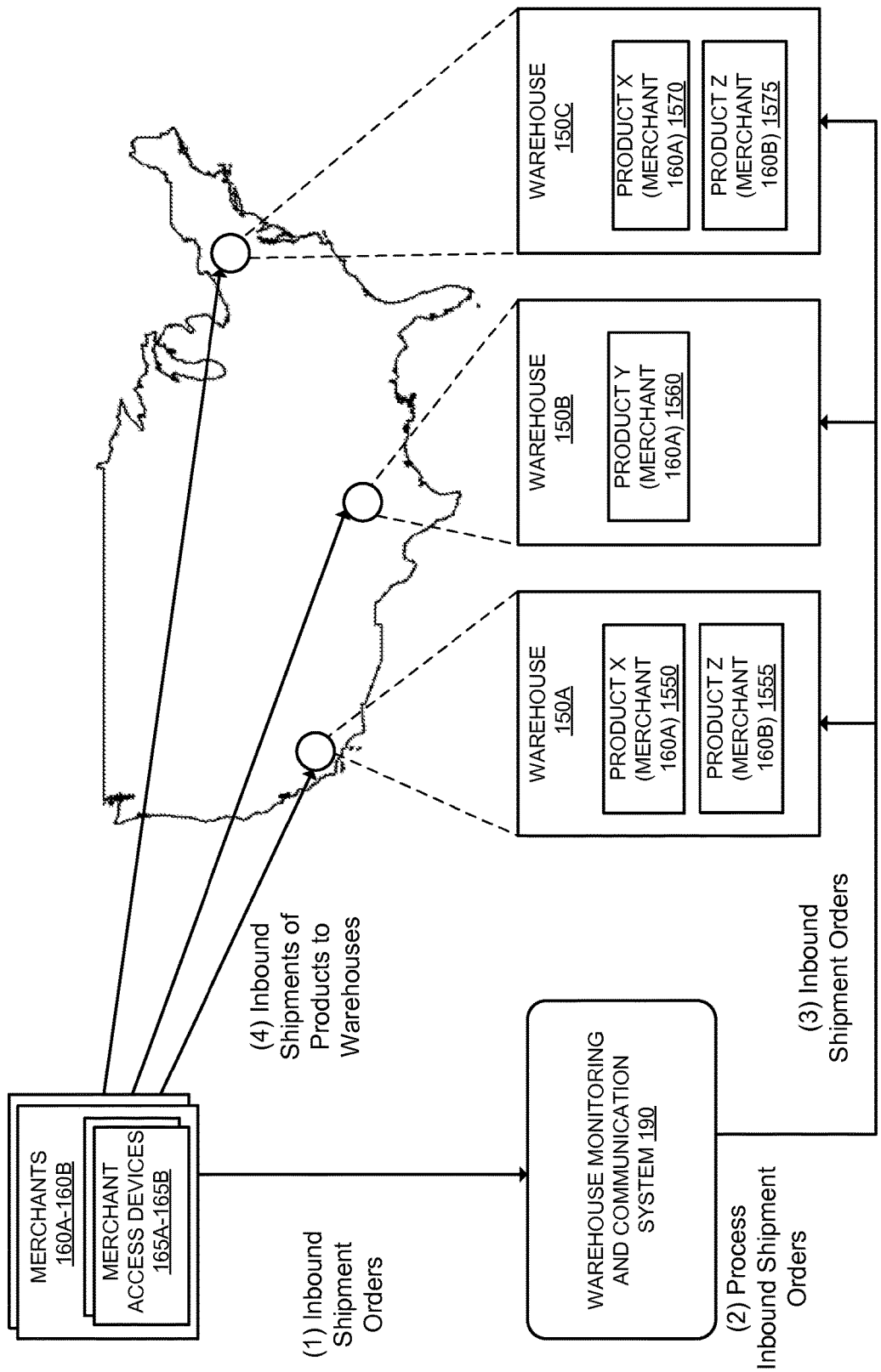
FIG. 15 is a data flow diagram illustrating the merchants using the online merchants to third party warehouse providers broker and order fulfillment system to arrange for inbound shipments of products to warehouses according to one embodiment of the invention.

FIG. 15 is a data flow diagram illustrating the merchants 160A-160B using the merchants and warehouses broker and order fulfillment system 190 to arrange for inbound shipments of products to the warehouses 150A-150C according to one embodiment of the invention. The warehouses 150A-150C are located in different geographical locations. As illustrated in FIG. 15, the warehouse 150A is located on the West Coast of the United States, the warehouse 150B is located in the middle of the United States, and the warehouse 150C is located in the East Cost of the United States. Of course, it should be understood that these locations are exemplary, as the warehouses may be located in different locations in the United States and in the World.

At operation 1, the merchants and warehouses broker and order fulfillment system 190 receives inbound shipment orders from the merchant access devices 165A-165B. According to one embodiment of the invention, the merchants and warehouses broker and order fulfillment system 190 receives the inbound shipment orders via the inbound shipment console 940 of the merchant portal application 125. The inbound shipment order(s) from the merchant 160A indicate, among other things, that a given quantity of product X is to be stored in the warehouse 150A, a given quantity of product X is to be stored in the warehouse 150C, and a given quantity of product Y is to be stored in the warehouse 150B. The inbound shipment order(s) from the merchant 160B indicate, among other things, that a given quantity of product Z is to be stored in the warehouse 150A, and a given quantity of product Z is to be stored in the warehouse 150C. Thus, in this example, the merchant 160A sells products X and Y, and the merchant 160B sells product Z.

Sometime later, at operation 2, the merchants and warehouses broker and order fulfillment system 190 processes the received inbound shipment orders. For example, the inbound shipment orders are validated with use of the data validation module 335, inventory is updated with the inventory module 325 (updated inventory reflected in the inventory table 225), and the inbound shipment module 350 adds a representation of the inbound shipment orders into the inbound shipment table 240 and/or the inbound shipment details table 255.

Sometime after the inbound shipment orders are processed, at operation 3, the inbound shipment orders are communicated with the warehouses 150A-150C. The different warehouses 150A-150C may use the inbound shipment export tool provided by the inbound shipments section 525 of the warehouse portal application 120 to retrieve a representation of the inbound shipment orders or the inbound shipment module 350 may automatically transmit the inbound shipment orders to the warehouses 150A-150C (e.g., using warehouse communication messages 625, email, etc.).

Sometime after the inbound shipment orders are communicated with the warehouses 150A-150C, the products corresponding to those shipping orders are shipped and stored in the warehouses 150A-150C. While in one embodiment of the invention the merchants 160A-160B pack and ship the products directly to the warehouses 150A-150C (with the use of a common carrier), in alternative embodiments of the invention the merchants 160A-160B arrange for the merchants and warehouses broker and order fulfillment system to pick up the products, pack, and ship them to the warehouses 150A-150C on behalf of the merchants 160A-160B. As illustrated in FIG. 14, the warehouse 150A stores product X (sold by merchant 160A) 1550 and product Z (sold by merchant 160B) 1555, the warehouse 150B stores product Y (sold by merchant 160A) 1560, and the warehouse 150C stores product X (sold by merchant 160A) 1570 and product Z (sold by merchant 160B) 1575.

Figure 16:
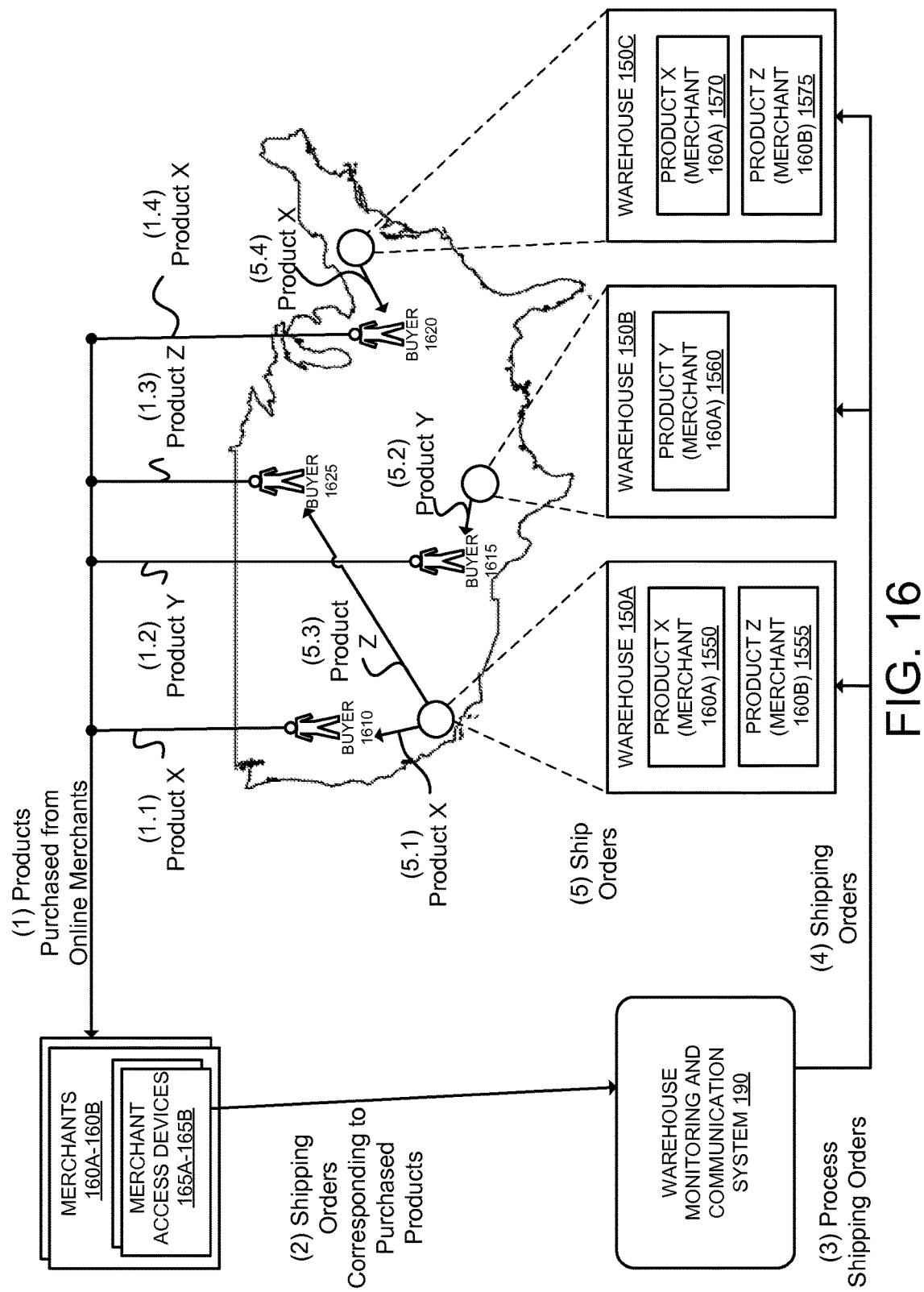
FIG. 16 is a data flow diagram illustrating different buyers in different locations buying the products that were stored as illustrated in FIG. 14 according to one embodiment of the invention.

Sometime after the products are stored (or at least shipped to the warehouses 150A-150C), those products are ready to be purchased and shipped to buyers. FIG. 16 is a data flow diagram illustrating different buyers in different locations buying the products that were stored as illustrated in FIG. 15 according to one embodiment of the invention. As illustrated in FIG. 16, the buyers 1610, 1615, 1620, and 1625 are in different geographic locations in the United States, however, it should be understood that the locations of the buyers are exemplary and the buyers may be located in different locations around the world.

At operation 1 of FIG. 16, products are purchased from the online merchants 160A-160B. Specifically, the buyer 1610 purchases product X from the merchant 160A at operation 1.1, the buyer 1615 purchases product Y from the merchant 160A at operation 1.2, the buyer 1625 purchases the product Z from the merchant 160B at operation 1.3, and the buyer 1620 purchases the product X from the merchant 160A at operation 1.4. Typically, the buyers 1610, 1615, 1620, and 1625 use the website of the merchants they have purchased the goods from.

Sometime after the products have been purchased, at operation 2, shipping the merchant access devices 165A-165B of the merchants 160A-160B respectively communicate shipping orders corresponding to the purchased products with the merchants and warehouses broker and order fulfillment system 190. In one embodiment of the invention, the e-commerce shopping carts of the merchants 160A-160B are directly integrated with the shipping order module 315 such that upon validation of the purchase order from the buyers (e.g., after payment has been successful), a shipping order is automatically communicated in real time to the shipping order module 315. In an alternative embodiment of the invention, the merchants 160A-160B use the shipping order interactive editing tool provided by the merchant shipping order console 935 of the merchant portal application 125 to provide the shipping orders to the merchants and warehouses broker and order fulfillment system 190.

In one embodiment of the invention, the shipping orders communicated to the merchants and warehouses broker and order fulfillment system 190 include which warehouse is to ship the products (if the same product is stored in multiple warehouses). For example, since a quantity of the products X and Z are stored in the warehouse 150A and 150C, the products X and Z may be shipped to the buyers from either warehouse 150A or 150C. However, it may be practical to favor one warehouse over another warehouse in a given situation. For example, one warehouse may be physically closer to the buyer than another. As another example, some warehouses may be able to provide next-day delivery, while others may take longer. The merchant access devices 165A-165B may include software to determine which warehouse to ship the product from based on numerous factors (e.g., the shipping requirements from the buyer (e.g., date of delivery, specific common carrier requirement, etc.), location of the buyer relative to the warehouses, inventory of the warehouses, the cost to ship the products from each warehouse, etc.). For example, since buyer 1610 has purchased product X, which is stored in the warehouses 150A and 150C, the shipping order for that purchase may indicate that the product is to be shipped from the warehouse 150A because it is closer in proximity to the buyer 1610 than the warehouse 150C (and thus may be delivered faster and cheaper than shipping from the warehouse 150C). Similarly, since buyer 1620 has purchased product X, which is stored in the warehouses 150A and 150C, the shipping order for that purchase may indicate that the product is to be shipped from the warehouse 150C because it is closer in proximity to the buyer 1610 than the warehouse 150A (and thus may be delivered faster and cheaper than shipping from the warehouse 150A).

In another embodiment of the invention, the shipping orders communicated to the merchants and warehouses broker and order fulfillment system 190 do not include an indication of which warehouse is to ship the products and the merchants and warehouses broker and order fulfillment system 190 determines which warehouse will ship the products.

Sometime after receiving the shipping orders, at operation 3, the merchants and warehouses broker and order fulfillment system 190 processes those shipping orders. For example, the shipping orders are validated with use of the data validation module 335, inventory is updated (e.g., the inventory module updates the inventory table 225 for merchant), and the shipping order module 315 adds a representation of the shipping orders into the shipping orders table 210 and/or the shipping order details table 215.

As described above, if the shipping orders do not indicate which warehouse to ship the product from (if there are multiple warehouses which store the product purchased), the shipping order module 315 determines which warehouse will ship the product to the buyer. The shipping order module 315 bases this determination on numerous factors (e.g., the shipping requirements from the buyer (e.g., date of delivery, specific common carrier requirement, etc.), location of the buyer relative to the warehouses, inventory of the warehouses, the cost to ship the products from each warehouse, etc.).

Sometime later, at operation 4, the shipping orders are communicated with the warehouses 150A-150C. In one embodiment of the invention, the warehouses 150A-150C each use the shipping order export tool provided by the warehouse portal shipping orders section 540 of the warehouse portal application 120 to periodically retrieve the shipping orders stored in the merchants and warehouse broker and order fulfillment system 190. In another embodiment of the invention, the merchants and warehouses broker and order fulfillment system 190 automatically sends the shipping orders to the warehouses 150A-150C (e.g., using warehouse communication messages 625, email, etc.).

The shipping orders communicated with the warehouse 150A instruct it to ship the product X to the buyer 1610 and to ship product Z to the buyer 1625. The shipping order communicated with the warehouse 150B instructs it to ship product Y to the buyer 1615. The shipping order communicated with the warehouse 150C instructs it to ship product X to the buyer 1620.

Sometime after the shipping orders have been received and processed by the warehouses 150A-150C, at operation 5, the warehouses 150A-150C ship the products to the buyers as instructed (typically using a common carrier not owned or operated by the warehouses 150A-150C). Specifically, the warehouse 150A ships the product X to the buyer 1610 at operation 5.1 and ships the product Z to the buyer 1625 at operation 5.3, the warehouse 150B ships the product Y to the buyer 1615 at operation 5.2, and the warehouse 150C ships the product X to the buyer 1620 at operation 5.4.

Figure 17:
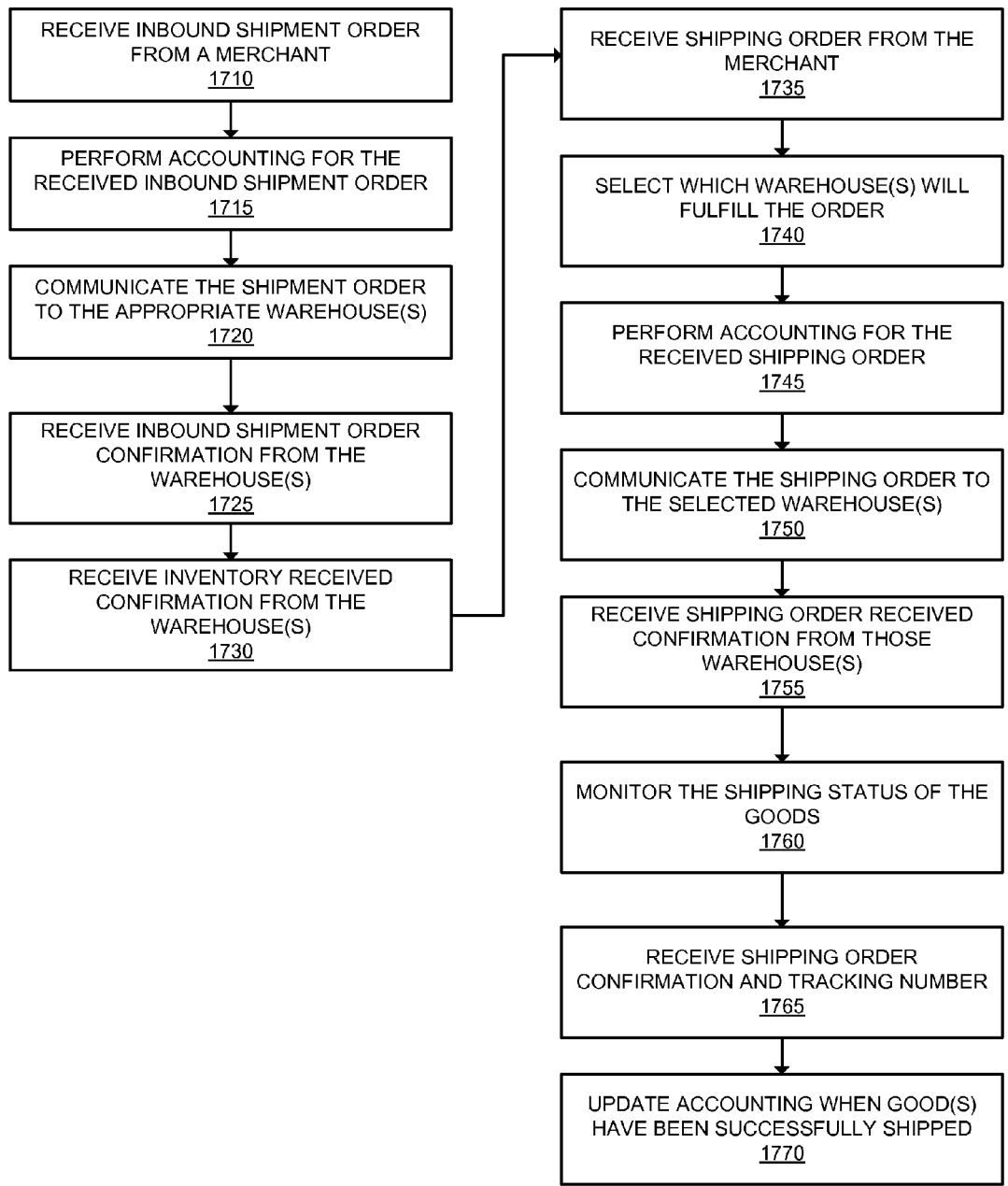
FIG. 17 is a flow diagram illustrating an exemplary transaction with a merchant and one or more warehouses including processing inbound shipment orders and outbound shipping orders according to one embodiment of the invention.

FIG. 17 is a flow diagram illustrating an exemplary transaction with a merchant and one or more warehouses including processing inbound shipment orders and outbound shipping orders according to one embodiment of the invention. In one embodiment, the order fulfillment system 190 performs the operations illustrated in FIG. 17.

At block 1710, the order fulfillment system 190 receives an inbound shipment order from a merchant (e.g., one of the merchants 160A-160N). For example, the inbound shipment order is received via the inbound shipment interactive editing tool of the merchant inbound shipment console 940. Flow then moves to block 1715, where the order fulfillment system 190 performs accounting for the shipment order (e.g., updating the products table 220, updating the inventory table 225, updating the inbound shipments table 240, and/or updating the inbound shipment details table 255). Control then flows to block 1720.

At block 1720, the order fulfillment system 190 communicates the received inbound shipment order to the appropriate warehouse(s) (as designated in the inbound shipment order). The order fulfillment system 190 may communicate the inbound shipment order to the appropriate warehouse(s) in different ways in different embodiments of the invention (e.g., posting the inbound shipment order on the warehouse portal application 120 (e.g., the home page 520 and/or the inbound shipments section 525), transmitting an email to those warehouses, calling the warehouses, faxing the inbound shipment order to those warehouses, and mailing the inbound shipment order to the warehouse). Flow moves from block 1720 to block 1725.

At block 1725, the order fulfillment system 190 receives and processes an inbound shipment order confirmation from those warehouses. For example, notice of the confirmation will be stored in the inbound shipments table 240 and/or the performance data table 250. Flow then moves to block 1730, where the order fulfillment system 190 receives and processes an inventory received confirmation from those warehouses. Thus, at this point, the warehouse(s) are storing goods for the merchant. Flow moves from block 1730 to block 1735.

At block 1735, the order fulfillment system 190 receives a shipping order from the merchant. In one embodiment, the shipping order is received through an integrated shopping cart of the merchant. Flow moves from block 1735 to block 1740, where the order fulfillment system 190 selects which one or more warehouse(s) will fulfill the order (i.e., which warehouse(s) will ship the goods to the customer for the order). The warehouse(s) may be selected based on the proximity of the warehouse(s) to the shipping address of the shipping order. For example, in one embodiment the nearest warehouse with enough stock to fill the order is selected to fill the order. If a single warehouse cannot fill the order, the next closest warehouse with enough stock to fill the order is selected to fill part of the order. Ties (e.g., multiple warehouse are approximately the same distance to the shipping address) may be broken in different ways in different embodiments of the invention (e.g., the warehouse with the highest performance track record (as determined from the collected performance metrics) is preferred over the other warehouses, the warehouse which is the cheapest is preferred over the other warehouses, or other subjective merchant preferences). Flow moves from block 1740 to block 1745 where accounting for the received shipping order is performed (e.g., updating the inventory table 225, updating the shipping orders table 210, etc.). Flow then moves to block 1750.

At block 1750, the order fulfillment system 190 communicates the shipping order to the selected warehouse(s). The order fulfillment system 190 may communicate the shipping order to the selected warehouse(s) in different ways in different embodiments of the invention (e.g., posting the shipping order on the warehouse portal application 120 (e.g., the home page 520 and/or the shipping orders section 540), transmitting an email to those warehouses with the shipping order, calling the warehouses to communicate the shipping order, faxing the shipping order to those warehouses, and mailing the shipping order to the selected warehouse(s)). Flow moves from block 1750 to block 1755.

At block 1755, the order fulfillment system 190 receives and processes a shipping order received confirmation from the selected warehouse(s). For example, notice of the confirmation will be stored in the shipping orders table 210 and/or the performance data table 250. Flow then moves to block 1760, where the order fulfillment system 190 monitors the shipping status of the goods as previously described. Flow next moves to block 1765, where the order fulfillment system 190 receives a shipping order confirmation and tracking number for a shipped order. The order fulfillment system 190 may check the validity of the tracking number a previously described. Flow then moves to block 1770 where the order fulfillment system 190 updates accounting when the goods have been successfully shipped as determined by the received shipping order confirmation.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed at an order fulfillment server of an online merchants to third party warehouse providers broker and order fulfillment system, comprising receiving, on a common merchant interface of the order fulfillment server, inbound shipment orders from online merchants, each inbound shipment order identifying one or more goods of one of the online merchants to be stored in one or more of a plurality of third party warehouses, wherein at least some of the plurality of third party warehouses are owned and operated by different third party warehouse providers and are not owned or operated by any of the online merchants;

for each inbound shipment order, performing the following, communicating a representation of that inbound shipment order on a common warehouse interface with a set of one or more of the plurality of third party warehouses that will store the goods, wherein the common warehouse interface allows each of the third party warehouse providers to communicate with the order fulfillment server in a common way, and receiving a set of one or more inbound shipment order parameters regarding that inbound shipment order on the common warehouse interface from those of the third party warehouse providers that correspond to the set of third party warehouses that received that inbound shipment order, wherein the set inbound shipment order parameters includes whether the one or more goods corresponding with each inbound shipment order has been received, wherein the common warehouse interface allows each of the different third party warehouse providers to view only their respective one or more outstanding inbound shipment orders and input the set of inbound shipment order parameters for each of their one or more outstanding inbound shipment orders;

receiving outbound shipping orders from, or on behalf of, the online merchants, each outbound shipping order identifying one or more types of goods of one of the online merchants to be shipped to a buyer, a quantity of those one or more types of goods, and a shipping address of the buyer;

for each outbound shipping order, performing the following:

selecting which one or more of the plurality of third party warehouses to fulfill the outbound shipping order from one or more of the inbound shipments, communicating a representation of that outbound shipping order on the common warehouse interface to the selected one or more of the plurality of third party warehouses, and receiving on the common warehouse interface, a set of one or more outbound shipping order parameters for that outbound shipping order from those of the third party warehouse providers that correspond to the selected one or more third party warehouses, wherein the set of outbound shipping order parameters includes whether the outstanding shipping order is complete, wherein the common warehouse interface allows each of the different third party warehouse providers to view only their respective one or more outstanding outbound shipping orders and input the set of outbound shipping order parameters for each of their one or more outstanding outbound shipping orders;

for each one of the plurality of third party warehouses and a given time period, the order fulfillment server generating a reverse invoice, wherein said generating the reverse invoice includes, aggregating one or more services completed by that third party warehouse over the given time period based on at least the received inbound shipment order parameters and the received outbound shipping order parameters, determining an amount of money owed to a third party warehouse provider corresponding with that third party warehouse for the aggregated one or more services completed, aggregating one or more service problems attributed to that third party warehouse over the given time period, including services not completed on time and services completed erroneously based on at least the received inbound shipment order parameters and the received outbound shipping order parameters, determining an amount of money to charge the third party warehouse provider for the aggregated one or more service problems, and reducing the amount of money owed to the third party warehouse provider for the one or more services completed by the amount of money to charge the third party warehouse provider for the one or more service problems; and responsive to determining that one of the plurality of third party warehouses is experiencing a failure, the order fulfillment server automatically generating and executing one or more disaster plans to compensate for outstanding outbound shipping orders that are affected by the failure, said automatically generating and executing including, determining one or more outstanding outbound shipping orders affected by the failure;

inactivating that one of the plurality of third party warehouses that is experiencing the failure to prevent that one of the plurality of third party warehouses from being used; and for each of those one or more outstanding outbound shipping orders, performing the following:

determining an alternate one or more of the plurality of third party warehouses to fulfill the one or more outstanding outbound shipping orders based on a set of one or more factors, wherein determining the alternate one or more of the plurality of third party warehouses includes calculating which one or more of the plurality of third party warehouses is optimal to complete the one or more outstanding outbound shipping orders, modifying the one or more outstanding outbound shipping orders including reallocating the one or more outstanding outbound shipping orders from the one of the plurality of third party warehouses experiencing the failure to the alternate one or more of the plurality of third party warehouses to fulfill the one or more outstanding outbound shipping orders, and communicating a representation of the outstanding outbound shipping order to the alternate one or more of the plurality of third party warehouses.

2. The method of claim 1, further comprising:
periodically monitoring, at the order fulfillment server, completed services and uncompleted services of each of the third party warehouses, wherein the completed services and uncompleted services include one or more of inbound shipment orders, outbound shipping orders, special projects, and tasks;

for each completed service, evaluating that completed service for one or more performance metrics including whether the completed service was completed on time and whether the completed service was erroneous;

storing the performance metrics; and determining to alter a relationship with one of the plurality of third party warehouses based on the stored performance metrics.

3. The method of claim 1, wherein the set of one or more factors include a cost and an amount of time to fulfill the outstanding outbound shipping order.

4. The method of claim 1, wherein the alternate one or more third party warehouses are operated by a different third party warehouse provider than the third party warehouse experiencing a failure.

5. The method of claim 1, wherein each of the sets of outbound shipping order parameters further includes a carrier tracking number, and wherein each of the sets of inbound shipment order parameters further includes a number of unexpected items that have been received.

6. The method of claim 1, further comprising:
for each of the plurality of online merchants, the order fulfillment server maintaining an inventory of each product stored in the plurality of third party warehouses, wherein the inventory is updated in real time based on any received inbound shipment orders and any received outbound shipping orders, and wherein the common merchant interface allows each of the online merchants to view only their inventory.

7. The method of claim 1, wherein each of the plurality of online merchants does not have a contract with any of the plurality of different third party warehouse providers.

8. The method of claim 1, further comprising:
providing a home page on the common warehouse interface for each of the plurality of different third party warehouse providers to review all services requested of them including one or more of inbound shipment orders, outbound shipping orders, special projects, and tasks.

9. The method of claim 1, wherein the common merchant interface allows each of the plurality of online merchants to access services provided by the plurality of third party warehouse providers including storing goods, inbound shipment order processing, and outbound shipment order processing, wherein the common merchant interface includes an inbound shipment order console to allow the online merchants to create inbound shipment orders and update existing inbound shipment orders.

10. The method of claim 9, further comprising:
integrating ecommerce shopping carts of at least some of the plurality of online merchants with the common merchant interface to allow real time communication of outbound shipping orders between the order fulfillment server.

11. The method of claim 9, wherein the common merchant interface further includes a special project console to allow the online merchants to create or update special projects for at least one of the plurality of third party warehouse providers including one or more of combining multiple single stock-keeping units (SKUs) to form a new combined SKU, opening a container SKU and inventorying its contents, preparing a large shipment for freight pickup, adding labels to their products, photographing their inventory, measuring their inventory, and disposing of their inventory.

12. An order fulfillment server for an online merchants to third party warehouse providers broker and order fulfillment system, comprising:
a merchant portal application to be installed in the order fulfillment server to allow a plurality of online merchants to interface to services provided by a plurality of different third party warehouse providers, the services including storing goods at a plurality of third party warehouses which are owned and operated by the third party warehouse providers and are not owned and operated by any of the online merchants, the merchant portal application including, an inbound shipment order console to allow inbound shipment orders to be created and updated by the online merchants, wherein each inbound shipment order identifies one or more goods of one of the online merchants to be stored in one or more of the plurality of third party warehouses, a shipping order console to receive outbound shipping orders from the online merchants, wherein each outbound shipping order identifies one or more types of goods of one of the online merchants to be shipped to a buyer, a quantity of those one or more types of goods, and a shipping address of the buyer;

a warehouse portal application to be installed in the order fulfillment server to communicate with each of the plurality of different third party warehouse providers in a common way, the warehouse portal application including, a warehouse home page to allow each of the plurality of third party warehouse providers to review all services requested of them by one or more of the online merchants, an inbound shipment orders section to perform the following:

for each inbound shipment order, communicate a representation of that inbound shipment order with one or more of the plurality of third party warehouses that will store the one or more goods, and receive a set of one or more inbound shipment order parameters from each third party warehouse provider that receives an inbound shipment order, wherein the set of inbound shipment order parameters includes whether the one or more goods corresponding with each inbound shipment order has been received, a outbound shipping orders section to perform the following:

for each outbound shipping order received from the online merchants, communicate a representation of that outbound shipping order with one or more of the plurality of third party warehouses, and receive a set of one or more outbound shipping order parameters from each third party warehouse provider that receives an outbound shipping order, wherein the set of outbound shipping order parameters includes whether the outstanding shipping order is complete; and a system operator portal application to be installed in the order fulfillment server to allow system operators to manage the plurality of third party warehouse providers, the system operator portal application including, an invoice console to generate a reverse invoice for each of the plurality of third party warehouses over a given time period, wherein generating the reverse invoice includes the following:

aggregate one or more services completed by that third party warehouse over the given time period based on at least the inbound shipment parameters and the outbound shipment parameters received from that third party warehouse, determine an amount of money owed to a third party warehouse provider corresponding with that third party warehouse for the aggregated one or more services completed, aggregate one or more service problems attributed to that third party warehouse over the given time period including services not completed on time and services completed erroneously based on at least the inbound shipment parameters and the outbound shipment parameters received from that third party warehouse, determine an amount of money to charge the third party warehouse provider for the aggregated one or more service problems, and reduce the amount of money owed to the third party warehouse provider for the one or more services completed by the amount of money to charge the third party warehouse provider for the one or more service problems, and a disaster recovery console to generate and execute one or more disaster recovery plans to recover from a failure of one of the plurality of third party warehouses, wherein upon a determination that one of the plurality of third party warehouses is experiencing a failure, generation and execution of the one or more disaster recovery plans includes the following:

automatically determine one or more outstanding outbound shipping orders affected by the failure, inactive that one of the plurality of third party warehouses that is experiencing the failure to prevent that one of the plurality of third party warehouses from being used, and for each of those one or more outstanding outbound shipping orders, performing the following:

determine an alternate one or more of the plurality of third party warehouses to fulfill the one or more outstanding outbound shipping orders based on a set of one or more factors, wherein the determination of the alternate one or more of the plurality of third party warehouses includes a calculation of which one or more of the plurality of third party warehouses is optimal to complete the one or more outstanding outbound shipping orders, modify the one or more outstanding outbound shipping orders including reallocating the one or more outstanding outbound shipping orders from the one of the plurality of third party warehouses experiencing the failure to the alternate one or more of the plurality of third party warehouses to fulfill the one or more outstanding outbound shipping orders, and communicate a representation of the outstanding outbound shipping order to the alternate one or more of the plurality of third party warehouses.

13. The order fulfillment server of claim 12, further comprising:

a warehouse performance monitoring module to perform the following:

periodically monitor completed services and uncompleted services of each of the plurality of third party warehouses, wherein the completed services and uncompleted services include one or more of inbound shipment orders, outbound shipment orders, special projects, and tasks, for each completed service, evaluate that completed service for one or more performance metrics including whether that completed service was completed on time and whether that completed service was completed erroneously, and store the performance metrics; and wherein the warehouse portal application further includes a warehouse performance console for the system operators to generate a performance report of a given one of the third party warehouses based on the stored performance metrics for that given third party warehouse.

14. The order fulfillment server of claim 12, wherein the set of one or more factors include a cost and an amount of time to fulfill the outstanding outbound shipping order.

15. The order fulfillment server of claim 12, wherein the alternate one or more third party warehouses are operated by a different third party warehouse provider than the third party warehouse experiencing a failure.

16. The order fulfillment server of claim 12, wherein each of the set of outbound shipping order parameters further includes a carrier tracking number, and wherein each of the set of inbound shipment order parameters further includes a number of unexpected items that have been received.

17. The order fulfillment server of claim 12, wherein the merchant portal application further includes an inventory console to allow each of the online merchants to review their inventory of goods that are stored in the third party warehouses.

18. The order fulfillment server of claim 12, wherein the outbound shipping order console is integrated with ecommerce shopping carts of at least some of the plurality of online merchants to allow real time communication of outbound shipping orders between the order fulfillment server.

19. The order fulfillment server of claim 12, wherein the merchant portal application further includes a special project console to allow each one of the online merchants to create or update special projects for at least one of the plurality of third party warehouse providers including one or more of combining multiple single stock-keeping units (SKUs) to form a new combined SKU, opening a container SKU and inventorying its contents, preparing a large shipment for freight pickup, adding labels to their products, photographing their inventory, measuring their inventory, and disposing of their inventory.

20. The order fulfillment server of claim 12, wherein each of the plurality of online merchants does not have a contract with any of the plurality of third party warehouse providers.

21. A non-transitory machine-readable storage medium that provides instructions that, if executed by a processor of an order fulfillment server of an online merchants to third party warehouse providers broker and order fulfillment system, will cause said processor to perform operations comprising:
  receiving, on a common merchant interface of the order fulfillment server, inbound shipment orders from online merchants, each inbound shipment order identifying one or more goods of one of the online merchants to be stored in one or more of a plurality of third party warehouses, wherein at least some of the plurality of third party warehouses are owned and operated by different third party warehouse providers and are not owned or operated by any of the online merchants;
  for each inbound shipment order, performing the following,
    communicating a representation of that inbound shipment order on a common warehouse interface with a set of one or more of the plurality of third party warehouses that will store the goods, wherein the common warehouse interface allows each of the third party warehouse providers to communicate with the order fulfillment server in a common way, and
    receiving a set of one or more inbound shipment order parameters regarding that inbound shipment order on the common warehouse interface from those of the third party warehouse providers that correspond to the set of third party warehouses that received that inbound shipment order, wherein the set inbound shipment order parameters includes whether the one or more goods corresponding with each inbound shipment order has been received, wherein the common warehouse interface allows each of the different third party warehouse providers to view only their respective one or more outstanding inbound shipment orders and input the set of inbound shipment order parameters for each of their one or more outstanding inbound shipment orders;
  receiving outbound shipping orders from, or on behalf of, the online merchants, each outbound shipping order identifying one or more types of goods of one of the online merchants to be shipped to a buyer, a quantity of those one or more types of goods, and a shipping address of the buyer;
  for each outbound shipping order, performing the following:
    selecting which one or more of the plurality of third party warehouses to fulfill the outbound shipping order from one or more of the inbound shipments,
    communicating a representation of that outbound shipping order on the common warehouse interface to the selected one or more of the plurality of third party warehouses, and
    receiving on the common warehouse interface, a set of one or more outbound shipping order parameters for that outbound shipping order from those of the third party warehouse providers that correspond to the selected third party warehouses, wherein the set of outbound shipping order parameters includes whether the outstanding shipping order is complete, wherein the common warehouse interface allows each of the different third party warehouse providers to view only their respective one or more outstanding outbound shipping orders and input the set of outbound shipping order parameters for each of their one or more outstanding outbound shipping orders;
  for each one of the plurality of third party warehouses and a given time period, the order fulfillment server generating a reverse invoice, wherein said generating the reverse invoice includes,
    aggregating one or more services completed by that third party warehouse over the given time period based on at least the received inbound shipment order parameters and the received outbound shipping order parameters,
    determining an amount of money owed to a third party warehouse provider corresponding with that third party warehouse for the aggregated one or more services completed,
    aggregating one or more service problems attributed to that third party warehouse over the given time period, including services not completed on time and services completed erroneously based on at least the received inbound shipment order parameters and the received outbound shipping order parameters,
    determining an amount of money to charge the third party warehouse provider for the aggregated one or more service problems, and
    reducing the amount of money owed to the third party warehouse provider for the one or more services completed by the amount of money to charge the third party warehouse provider for the one or more service problems; and
  responsive to determining that one of the plurality of third party warehouses is experiencing a failure, the order fulfillment server automatically generating and executing one or more disaster plans to compensate for outstanding outbound shipping orders that are affected by the failure, said automatically generating and executing including,
    determining one or more outstanding outbound shipping orders affected by the failure;
    inactivating that one of the plurality of third party warehouses that is experiencing the failure to prevent that one of the plurality of third party warehouses from being used; and
    for each of those one or more outstanding outbound shipping orders, performing the following:
      determining an alternate one or more of the plurality of third party warehouses to fulfill the one or more outstanding outbound shipping orders based on a set of one or more factors, wherein determining the alternate one or more of the plurality of third party warehouses includes calculating which one or more of the plurality of third party warehouses is optimal to complete the one or more outstanding outbound shipping orders, modifying the one or more outstanding outbound shipping orders including reallocating the one or more outstanding outbound shipping orders from the one of the plurality of third party warehouses experiencing the failure to the alternate one or more of the plurality of third party warehouses to fulfill the one or more outstanding outbound shipping orders, and communicating a representation of the outstanding outbound shipping order to the alternate one or more of the plurality of third party warehouses.

22. The non-transitory machine-readable storage medium 21, further comprising:

periodically monitoring, at the order fulfillment server, completed services and uncompleted services of each of the third party warehouses, wherein the completed services and uncompleted services include one or more of inbound shipment orders, outbound shipping orders, special projects, and tasks;

for each completed service, evaluating that completed service for one or more performance metrics including whether the completed service was completed on time and whether the completed service was erroneous;

storing the performance metrics; and determining to alter a relationship with one of the plurality of third party warehouses based on the stored performance metrics.

23. The non-transitory machine-readable storage medium 21, wherein the set of one or more factors include a cost and an amount of time to fulfill the outstanding outbound shipping order.

24. The non-transitory machine-readable storage medium 21, wherein the alternate one or more third party warehouses are operated by a different third party warehouse provider than the third party warehouse experiencing a failure.

25. The non-transitory machine-readable storage medium 21, wherein each of the sets of outbound shipping order parameters further includes a carrier tracking number, and wherein each of the sets of inbound shipment order parameters further includes a number of unexpected items that have been received.

26. The non-transitory machine-readable storage medium 21, further comprising:

for each of the plurality of online merchants, the order fulfillment server maintaining an inventory of each product stored in the plurality of third party warehouses, wherein the inventory is updated in real time based on any received inbound shipment orders and any received outbound shipping orders, and wherein the common merchant interface allows each of the online merchants to view only their inventory.

27. The non-transitory machine-readable storage medium 21, wherein each of the plurality of online merchants does not have a contract with any of the plurality of different third party warehouse providers.

28. The non-transitory machine-readable storage medium 21, further comprising:

providing a home page on the common warehouse interface for each of the plurality of different third party warehouse providers to review all services requested of them including one or more of inbound shipment orders, outbound shipping orders, special projects, and tasks.

29. The non-transitory machine-readable storage medium 21, wherein the common merchant interface allows each of the plurality of online merchants to access services provided by the plurality of third party warehouse providers including storing goods, inbound shipment order processing, and outbound shipment order processing, wherein the common merchant interface includes an inbound shipment order console to allow the online merchants to create inbound shipment orders and update existing inbound shipment orders.

30. The non-transitory machine-readable storage medium 29, further comprising:

integrating ecommerce shopping carts of at least some of the plurality of online merchants with the common merchant interface to allow real time communication of outbound shipping orders between the order fulfillment server.

31. The non-transitory machine-readable storage medium 29, wherein the common merchant interface further includes a special project console to allow the online merchants to create or update special projects for at least one of the plurality of third party warehouse providers including one or more of combining multiple single stock-keeping units (SKUs) to form a new combined SKU, opening a container SKU and inventorying its contents, preparing a large shipment for freight pickup, adding labels to their products, photographing their inventory, measuring their inventory, and disposing of their inventory.

* * * * *